United States Patent
Tsai et al.

(10) Patent No.: US 8,514,500 B2
(45) Date of Patent: Aug. 20, 2013

(54) IMAGING LENS SYSTEM

(75) Inventors: Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 37 days.

(21) Appl. No.: 13/437,808

(22) Filed: Apr. 2, 2012

(65) Prior Publication Data
US 2013/0182335 A1    Jul. 18, 2013

(30) Foreign Application Priority Data

Jan. 18, 2012 (TW) .............................. 101101897 A

(51) Int. Cl.
*G02B 3/02*    (2006.01)
*G02B 9/60*    (2006.01)

(52) U.S. Cl.
USPC ............................ 359/714; 359/763; 359/764

(58) Field of Classification Search
USPC ......................... 359/714, 763, 764, 765, 766
See application file for complete search history.

(56) References Cited

U.S. PATENT DOCUMENTS
7,365,920 B2    4/2008    Noda
7,826,149 B2    11/2010   Tang et al.
8,072,695 B1    12/2011   Lee et al.

*Primary Examiner* — Jack Dinh
(74) *Attorney, Agent, or Firm* — Morris Manning & Martin LLP; Tim Tingkang Xia, Esq.

(57) ABSTRACT

This invention provides an imaging lens system in order from an object side to an image side comprising five lens elements with refractive power: a first lens element with positive refractive power having a convex object-side surface; a second lens element with negative refractive power; a plastic third lens element having at least one of the object-side and image-side surfaces thereof being aspheric; a plastic fourth lens element having a concave image side surface, at least one of the object-side and image-side surfaces thereof being aspheric; and a plastic fifth lens element having a convex object side surface and a convex image-side surface, at least one of the object-side and image-side surfaces thereof being aspheric. By such arrangement, especially with the fourth lens element having the concave image side surface, the imaging lens system can correct peripheral rays while further improving the image resolution thereof.

25 Claims, 20 Drawing Sheets

IMAGING LENS SYSTEM

CROSS-REFERENCE TO RELATED APPLICATIONS

This non-provisional application claims priority under 35 U.S.C. §119(a) on Patent Application No. 101101897 filed in Taiwan, R.O.C. on Jan. 18, 2012, the entire contents of which are hereby incorporated by reference.

BACKGROUND OF THE INVENTION

1. Field of the Invention

The present invention relates to an imaging lens system, and more particularly, to a compact imaging lens system used in imaging or three-dimensional (3D) imaging application of electronic products.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing. Moreover, with the popularity of high level portable electronic products, such as smart phone and PDA (Personal Digital Assistant), the demand for higher pixel-count and image quality of compact imaging lens system increase fast, and the conventional lens system with four lens elements can no longer satisfy the imaging lens systems of even higher level.

In order to satisfy the demand of even higher level, a conventional lens system with five lens elements, such as disclosed in U.S. Pat. No. 7,826,149 or No. 8,072,695, adopts one more lens element to improve the performance of the lens system. However, those conventional lens systems with five lens elements inevitably have the drawback of excessively long total track length, and there are still room for improvement of the resolution of peripheral field and the sensitivity of the image sensor thereof.

Accordingly, the field requires a suitable lens system for compact and portable electronic products, which has good image quality and photosensitivity.

SUMMARY OF THE INVENTION

The present invention provides an imaging lens system, in order from an object side to an image side comprising five lens elements with refractive power: a first lens element with positive refractive power having a convex object-side surface; a second lens element with negative refractive power; a plastic third lens element having at least one of the object-side and image-side surfaces thereof being aspheric; a plastic fourth lens element having a concave image-side surface, at least one of the object-side and image-side surfaces thereof being aspheric; and a plastic fifth lens element with positive refractive power having a convex object-side surface and a convex image-side surface, and at least one of the object-side and image-side surfaces thereof being aspheric; wherein a focal length of the imaging lens system is f, a focal length of the third lens element is f3, an axial distance between the object-side surface of the first lens element and an image plane is TTL, a maximal image height of the imaging lens system is ImgH, a back focal length of the imaging lens system is BFL, and they satisfy the following relations: $|f/f3|<1.1$; $TTL/ImgH<2.0$; and $0<BFL/TTL<0.40$.

On the other hand, the present invention provides an imaging lens system, in order from an object side to an image side comprising five non-cemented lens elements with refractive power: a first lens element with positive refractive power having a convex object-side surface; a second lens element with negative refractive power; a plastic third lens element having at least one of the object-side and image-side surfaces thereof being aspheric; a plastic fourth lens element having a concave image-side surface, at least one of the object-side and image-side surfaces thereof being aspheric; and a plastic fifth lens element with positive refractive power having a convex object-side surface and a convex image-side surface, and at least one of the object-side and image-side surfaces thereof being aspheric; wherein a focal length of the imaging lens system is f, a focal length of the fifth lens element is f5, a central thickness of the third lens element is CT3, an axial distance between the second lens element and the third lens element is T23, the imaging lens system further comprises a stop, an axial distance between the stop and the image-side surface of the fifth lens element is SD, an axial distance between the object-side surface of the first lens element and the image-side surface of the fifth lens element is TD, and they satisfy the following relations: $0<f/f5<1.2$; $0.1<CT3/T23<0.8$; and $0.7<SD/TD<1.1$.

In addition, the present invention provides an imaging lens system, in order from an object side to an image side comprising five lens elements with refractive power: a first lens element with positive refractive power having a convex object-side surface; a second lens element with negative refractive power; a plastic third lens element having at least one of the object-side and image-side surfaces thereof being aspheric; a plastic fourth lens element having a concave image-side surface, at least one of the object-side and image-side surfaces thereof being aspheric, at least one inflection point is positioned on at least one of the object-side and image-side surfaces thereof; and a plastic fifth lens element with positive refractive power having a convex object-side surface and a convex image-side surface, and at least one of the object-side and image-side surfaces thereof being aspheric; wherein a focal length of the imaging lens system is f, a focal length of the second lens element is f2, a focal length of the third lens element is f3, and they satisfy the following relations: $-1.4<f/f2<0$; and $|f/f3|<1.1$.

Furthermore, the present invention provides an imaging lens system, in order from an object side to an image side comprising five lens elements with refractive power: a first lens element with positive refractive power having a convex object-side surface; a second lens element with negative refractive power; a plastic third lens element having a convex image-side surface, at least one of the object-side and image-side surfaces thereof being aspheric; a plastic fourth lens element having a convex object-side surface and a concave image-side surface, at least one of the object-side and image-side surfaces thereof being aspheric, and at least one inflection point is positioned on at least one of the object-side and image-side surfaces thereof; and a plastic fifth lens element with positive refractive power having a convex object-side surface and a convex image-side surface, and at least one of the object-side and image-side surfaces thereof being aspheric; wherein an axial distance between the object-side surface of the first lens element and an image plane is TTL, a maximal image height of the imaging lens system is ImgH, a central thickness of the second lens element is CT2, a central thickness of the third lens element is CT3, a central thickness of the fifth lens element is CT5, and they satisfy the following relations: TTL/ImgH<2.0; and 0<(CT2+CT3)/CT5<2.0.

By such arrangement, especially with the fourth lens element having the concave image side surface, the imaging lens system can correct peripheral rays while further improving the image resolution thereof.

In the aforementioned imaging lens system, when the first lens element, the second lens element, the third lens element, the fourth lens element, and the fifth lens element are all non-cemented lens elements, the difficulty of manufacturing those lens elements can be avoided, and thereby the cost is lowered.

In the aforementioned imaging lens system, the first lens element has positive refractive power and thereby can provide significant refractive power needed for the system and is favorable for reducing the total track length thereof. When the second lens element has negative refractive power, the aberration produced by the first lens element with positive refractive power can be effectively corrected. When the fifth lens element has positive refractive power, the high order aberration of the system can be favorably corrected for improving the resolution thereof.

In the aforementioned image capturing lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. When the third lens element has a concave object-side surface and a convex image-side surface, it is favorable for correcting the astigmatism and the high order aberration of the system. When the fourth lens element has a concave image-side surface, the correction ability for peripheral ray can be effectively enhanced, and thereby the image resolution of peripheral field can be improved. When the fourth lens element has a convex object-side surface and a concave image-side surface, it is further favorable for correcting the astigmatism and the high order aberration of the system. Furthermore, when at least one inflection is formed on the fourth lens element, the incident angle on the image sensor from the off-axis field can be effectively reduced so that the sensing efficiency of the image sensor can be improved and the off-axis aberration can be corrected. When the object-side and the image-side surfaces of fifth lens element are both concave, the incident angle on the image sensor from the peripheral field can be effectively reduced so that the sensitivity of the image sensor can be favorably improved, and thereby reducing the interference.

DETAILED DESCRIPTION OF THE PREFERRED EMBODIMENTS

Figure 1A:
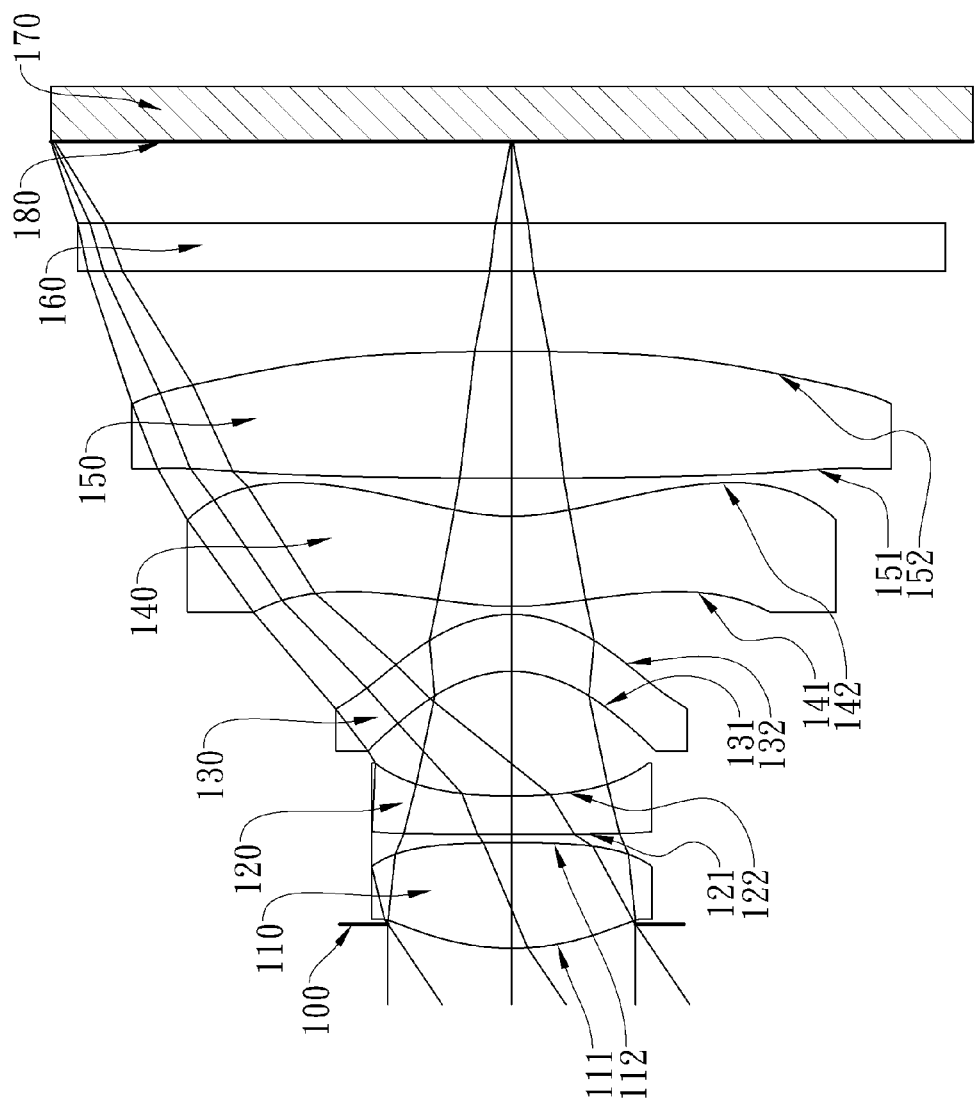
FIG. 1A shows an imaging lens system in accordance with a first embodiment of the present invention.

The present invention provides an imaging lens system, in order from an object side to an image side comprising five lens elements with refractive power: a first lens element with positive refractive power having a convex object-side surface; a second lens element with negative refractive power; a plastic third lens element having at least one of the object-side and image-side surfaces thereof being aspheric; a plastic fourth lens element having a concave image-side surface, at least one of the object-side and image-side surfaces thereof being aspheric; and a plastic fifth lens element with positive refractive power having a convex object-side surface and a convex image-side surface, and at least one of the object-side and image-side surfaces thereof being aspheric.

In an alternative embodiment of the present imaging lens system, the lens elements of the imaging lens system can be non-cemented lens elements. Including non-cemented lens elements can reduce the manufacturing complexity thus provide higher lens production yield rate.

In an alternative embodiment of the present imaging lens system, the third lens element can have a convex image-side surface. The astigmatism can be corrected. Additionally, the third lens element can have a concave object-side surface, and provide high-order aberration corrections in the imaging lens system by being a meniscus lens element.

In an alternative embodiment of the present imaging lens system, the fourth lens element can have a convex object-side surface, which can be favorable for correcting the astigmatism and the high order aberration of the system. Furthermore, at least one inflection point can be positioned on the fourth lens element to provide off-axis aberration corrections.

A focal length of the imaging lens system is f, a focal length of the second lens element is f2, a focal length of the third lens element is f3, a focal length of the fifth lens element is f5, a central thickness of the second lens element is CT2, a central thickness of the third lens element is CT3, a central thickness of the fifth lens element is CT5, an axial distance between the second lens element and the third lens element is T23, the imaging lens system further comprises a stop, an axial distance between the stop and the image-side surface of the fifth lens element is SD, an axial distance between the object-side surface of the first lens element and the image-side surface of the fifth lens element is TD, an axial distance between the object-side surface of the first lens element and an image plane is TTL, a maximal image height of the imaging lens system is ImgH, which is also defined here as half of a diagonal length of an effective photosensitive area of an image sensor, a back focal length of the imaging lens system is BFL, and at least one of the following relations can be satisfied: $|f/f3|<1.1$; $TTL/ImgH<2.0$; $0<BFL/TTL<0.40$; $0<f/f5<1.2$; $0.1<CT3/T23<0.8$; $0.7<SD/TD<1.1$; $-1.4<f/f2<0$; and $0<(CT2+CT3)/CT5<2.0$.

When the relation of $|f/f3|<1.1$ is satisfied, the refractive power of the third lens element can be well-controlled for collaborating with the refractive power disposition of the whole system.

When the relation of $TTL/ImgH<2.0$ is satisfied, it is favorable for keeping the system compact for equipping on portable electronic products.

When the relation of $0<BFL/TTL<0.40$ is satisfied, it can ensure that the system has enough back focal length for assembling the lens system and focusing.

When the relation of $0<f/f5<1.2$ is satisfied, the fifth lens element can act as a correcting lens, which is favorable for correcting the astigmatism and distortion of the system, and thereby improving the resolution thereof. Preferably, $0<f/f5<0.9$ can be satisfied.

When the relation of $0.1<CT3/T23<0.8$ is satisfied, the thickness of the third lens element is more suitable; that is, the relation between the thickness of the third lens element and distance between the second and the third lens element is more suitable for improving the image quality while avoiding the total track length of the system being excessively long.

When the relation of $0.7<SD/TD<1.1$ is satisfied, a balance between telecentricity and wide field of view of the system can be obtained.

When the relation of $-1.4<f/f2<0$ is satisfied, the refractive power of the second lens element is more suitable for correcting the aberration provided by the first lens element.

When the relation of $0<(CT2+CT3)/CT5<2.0$ is satisfied, the thickness of each lens element in the aforesaid system is more suitable for assembling the lens system and keeping an appropriate optical total track length.

In the aforementioned imaging lens system, a focal length of the imaging lens system is f, the focal length of the first lens element is f1, and they preferably satisfy the following relation: $1.0<f/f1<1.9$. When the above relation is satisfied, the refractive power of the first lens element is more suitable for shortening the total track length of the system.

In the aforementioned imaging lens system, a curvature radius of the object-side surface of the fourth lens element is R7, a curvature radius of the image-side surface of the fourth lens element is R8, and they preferably satisfy the following relation: $0.4<R7/R8<3.0$. When the above relation is satisfied, the aberration of the system can be favorably corrected for improving the resolution of the system.

In the aforementioned imaging lens system, a curvature radius of the object-side surface of the second lens element is R3, a curvature radius of the image-side surface of the second lens element is R4, and they preferably satisfy the following relation: $0<(R3+R4)/(R3-R4)<3.5$. When the above relation is satisfied, the curvature of the second lens element can be favorable for correcting the aberration of the system.

In the aforementioned imaging lens system, an Abbe number of the first lens element is V1, an Abbe number of the second lens element is V2, and they preferably satisfy the following relation: $27<V1-V2<45$. When the above relation is satisfied, the chromatic aberration of the system can be favorably corrected.

In the aforementioned imaging lens system, a curvature radius of the image-side surface of the fourth lens element is R8, a curvature radius of the object-side surface of the fifth lens element is R9, and they preferably satisfy the following relation: $0<R8/R9<0.6$. When the above relation is satisfied, the curvature of the fourth and fifth lens elements is more suitable for providing superior aberration adjustments.

In the aforementioned imaging lens system, a focal length of the imaging lens system is f, a focal length of the fifth lens element is f5, and they preferably satisfy the following relation: $0<f/f5<0.9$. When the above relation is satisfied, the fifth lens element can act as a correcting lens, which is favorable for correcting the astigmatism and distortion of the system, and thereby improving the resolution thereof.

In the aforementioned imaging lens system, the lens elements can be made of glass or plastic material. If the lens elements are made of glass, the freedom for distributing the refractive power of the imaging lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the imaging lens system can be effectively reduced.

In the present imaging lens system, if a lens element has a convex surface, it means the portion of the surface in proximity to the optical axis is convex; if a lens element has a concave surface, it means the portion of the surface in proximity to the optical axis is concave.

In the present imaging lens system, there can be at least one stop, such as a glare stop or a field stop, provided for eliminating stray light and thereby promoting image resolution thereof.

In the present image capturing optical system, a stop can be configured as a front stop or a middle stop. A front stop can provide a longer distance between an exit pupil of the system and an image plane which can improve the image-sensing efficiency of an image sensor such as CCD or CMOS. A middle stop is favorable for enlarging the field of view of the system as well as providing features associated with a wider field of view.

Preferred embodiments of the present invention will be described in the following paragraphs by referring to the accompanying drawings.

Embodiment 1

Figure 1B:
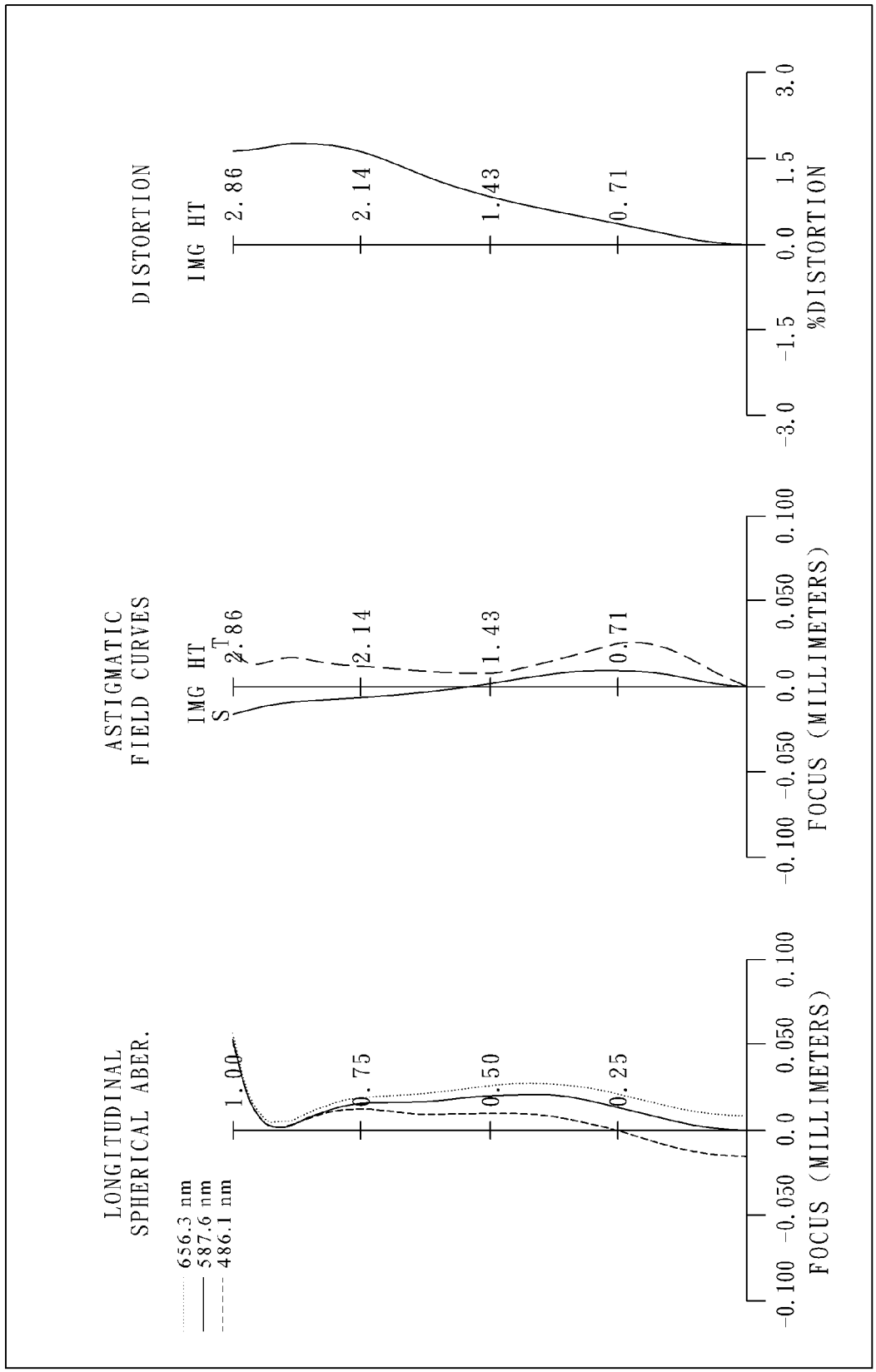
FIG. 1B shows the aberration curves of the first embodiment of the present invention.

FIG. 1A shows an imaging lens system in accordance with the first embodiment of the present invention, and FIG. 1B shows the aberration curves of the first embodiment of the present invention. The imaging lens system of the first embodiment of the present invention comprises five non-cemented lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with negative refractive power having a convex object-side surface 121 and a concave image-side surface 122, the object-side and image-side surfaces 121 and 122 thereof being aspheric;

a third lens element 130 made of plastic with positive refractive power having a concave object-side surface 131 and a convex image-side surface 132, the object-side and image-side surfaces 131 and 132 thereof being aspheric;

a fourth lens element 140 made of plastic with negative refractive power having a convex object-side surface 141 and a concave image-side surface 142, the object-side and image-side surfaces 141 and 142 thereof being aspheric, and at least one inflection point is formed on both the object-side surface 141 and the image-side surface 142 thereof; and a fifth lens element 150 made of plastic with positive refractive power having a convex object-side surface 151 and a convex image-side surface 152, the object-side and image-side surfaces 151 and 152 thereof being aspheric;

wherein a stop, can be an aperture stop 100, is disposed between an imaged object and the first lens element 110;

the imaging lens system further comprises an IR filter 160 disposed between the image-side surface 152 of the fifth lens element 150 and an image plane 180, and the IR filter 160 is made of glass and has no influence on the focal length of the imaging lens system; the imaging lens system further comprises an image sensor 170 provided on the image plane 180.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 4.15 mm, Fno = 2.70, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.150 | | | | |
| 2 | Lens 1 | 1.558020 (ASP) | 0.657 | Plastic | 1.544 | 55.9 | 2.53 |
| 3 | | −10.104800 (ASP) | 0.050 | | | | |
| 4 | Lens 2 | 44.374000 (ASP) | 0.240 | Plastic | 1.640 | 23.3 | −5.24 |
| 5 | | 3.112700 (ASP) | 0.777 | | | | |
| 6 | Lens 3 | −0.727480 (ASP) | 0.354 | Plastic | 1.544 | 55.9 | 18.65 |
| 7 | | −0.795210 (ASP) | 0.050 | | | | |
| 8 | Lens 4 | 2.012880 (ASP) | 0.561 | Plastic | 1.544 | 55.9 | −14.36 |
| 9 | | 1.443280 (ASP) | 0.235 | | | | |
| 10 | Lens 5 | 43.029300 (ASP) | 0.789 | Plastic | 1.535 | 56.3 | 34.48 |
| 11 | | −32.041000 (ASP) | 0.500 | | | | |
| 12 | IR-filter | Plano | 0.300 | Glass | 1.517 | 64.2 | — |
| 13 | | Plano | 0.506 | | | | |
| 14 | Image | Plano | — | | | | |

* Reference wavelength is 587.6 nm (d-line)

TABLE 2

Aspheric Coefficients

| | Surface # | | | | |
|---|---|---|---|---|---|
| | 2 | 3 | 4 | 5 | 6 |
| k = | −1.11471E+00 | −4.40057E+01 | 3.00000E+00 | 3.76521E−01 | −2.93935E+00 |
| A4 = | 1.75183E−03 | −1.35597E−01 | 1.35250E−02 | 1.35557E−01 | −4.40073E−01 |
| A6 = | 1.21681E−02 | −4.30252E−02 | −1.32430E−02 | 1.66766E−02 | 3.40186E−01 |
| A8 = | −1.01806E−01 | −6.17697E−02 | −3.78488E−02 | 5.13951E−02 | 7.01881E−02 |
| A10 = | −1.84186E−01 | −1.57537E−04 | −3.82448E−02 | −1.43386E−01 | −7.33176E−02 |
| A12 = | 3.50045E−01 | 9.32697E−02 | 3.09394E−01 | 8.95556E−02 | −3.23799E−01 |
| A14 = | −5.24312E−02 | 7.25932E−02 | −5.96524E−02 | 3.46529E−01 | 7.35538E−01 |
| A16 = | −3.39505E−01 | −2.14505E−01 | −1.66406E−01 | −3.21664E−01 | −5.74162E−01 |

| | Surface # | | | | |
|---|---|---|---|---|---|
| | 7 | 8 | 9 | 10 | 11 |
| k = | −1.35932E+00 | −1.88258E+01 | −9.16674E+00 | −7.00000E+01 | −7.00000E+01 |
| A4 = | −5.68647E−02 | −7.91429E−02 | −5.28179E−02 | 2.22995E−04 | −2.37072E−02 |
| A6 = | −7.61929E−03 | 3.16688E−02 | 1.69575E−02 | −4.68155E−05 | 4.25393E−03 |
| A8 = | 9.51652E−02 | −1.14709E−02 | −5.49010E−03 | 1.66093E−04 | −3.55965E−05 |
| A10 = | 6.79761E−02 | 1.22331E−03 | 7.47204E−04 | 3.85292E−06 | −2.58126E−05 |
| A12 = | −4.52519E−02 | 1.95615E−04 | −2.55977E−06 | −7.37754E−06 | −2.41495E−06 |
| A14 = | −4.81091E−02 | −3.39950E−05 | −8.68525E−06 | | |
| A16 = | 2.39212E−02 | | | | |

The equation of the aspheric surface profiles is expressed as follows:

$$X(Y) = (Y2/R)/(1 + \text{sqrt}(1 - (1+k)*(Y/R)2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius k: the conic coefficient;

Ai: the aspheric coefficient of order i.

In the first embodiment of the present imaging lens system, the focal length of the imaging lens system is f, and it satisfies the following relation: f=4.15 (mm).

In the first embodiment of the present imaging lens system, the f-number of the imaging lens system is Fno, and it satisfies the relation: Fno=2.70.

In the first embodiment of the present imaging lens system, half of the maximal field of view of the imaging lens system is HFOV, and it satisfies the relation: HFOV=34.0 deg.

In the first embodiment of the present imaging lens system, an Abbe number of the first lens element 110 is V1, an Abbe number of the second lens element 120 is V2, and they satisfy the following relation: V1−V2=32.6.

In the first embodiment of the present imaging lens system, a central thickness of the third lens element 130 is CT3, an axial distance between the second lens element 120 and the third lens element 130 is T23, and they satisfy the relation: CT3/T23=0.46.

In the first embodiment of the present imaging lens system, a central thickness of the second lens element 120 is CT2, a central thickness of the third lens element 130 is CT3, a central thickness of the fifth lens element 150 is CT5, and they satisfy the relation: (CT2+CT3)/CT5=0.75.

In the first embodiment of the present imaging lens system, a curvature radius of the object-side surface 121 of the second lens element 120 is R3, a curvature radius of the image-side surface 122 of the second lens element 120 is R4, and they satisfy the relation: (R3+R4)/(R3−R4)=1.15.

In the first embodiment of the present imaging lens system, a curvature radius of the object-side surface 141 of the fourth lens element 140 is R7, a curvature radius of the image-side surface 142 of the fourth lens element 140 is R8, and they satisfy the relation: R7/R8=1.39.

In the first embodiment of the present imaging lens system, a curvature radius of the image-side surface 142 of the fourth lens element 140 is R8, a curvature radius of the object-side surface 151 of the fifth lens element 150 is R9, and they satisfy the relation: R8/R9=0.03.

In the first embodiment of the present imaging lens system, the focal length of the imaging lens system is f, the focal length of the first lens element 110 is f1, and they satisfy the relation: f/f1=1.64.

In the first embodiment of the present imaging lens system, the focal length of the imaging lens system is f, the focal length of the second lens element 120 is f2, and they satisfy the relation: f/f2=−0.79.

In the first embodiment of the present imaging lens system, the focal length of the imaging lens system is f, the focal length of the third lens element 130 is f3, and they satisfy the relation: |f/f3|=0.22.

In the first embodiment of the present imaging lens system, the focal length of the imaging lens system is f, the focal length of the fifth lens element 150 is f5, and they satisfy the relation: f/f5=0.12.

In the first embodiment of the present imaging lens system, an axial distance between the stop 100 and the image-side surface 152 of the fifth lens element 150 is SD, an axial distance between the object-side surface 111 of the first lens element 110 and the image-side surface 152 of the fifth lens element 150 is TD, and they satisfy the relation: SD/TD=0.96.

In the first embodiment of the present imaging lens system, a back focal length of the imaging lens system is BFL, an axial distance between the object-side surface 111 of the first lens element 110 and the image plane 180 is TTL, and they satisfy the relation: BFL/TTL=0.26.

In the first embodiment of the present imaging lens system, an axial distance between the object-side surface 111 of the first lens element 110 and the image plane 180 is TTL, a maximal image height of the imaging lens system is ImgH, and they satisfy the relation: TTL/ImgH=1.72.

Embodiment 2

Figure 2A:
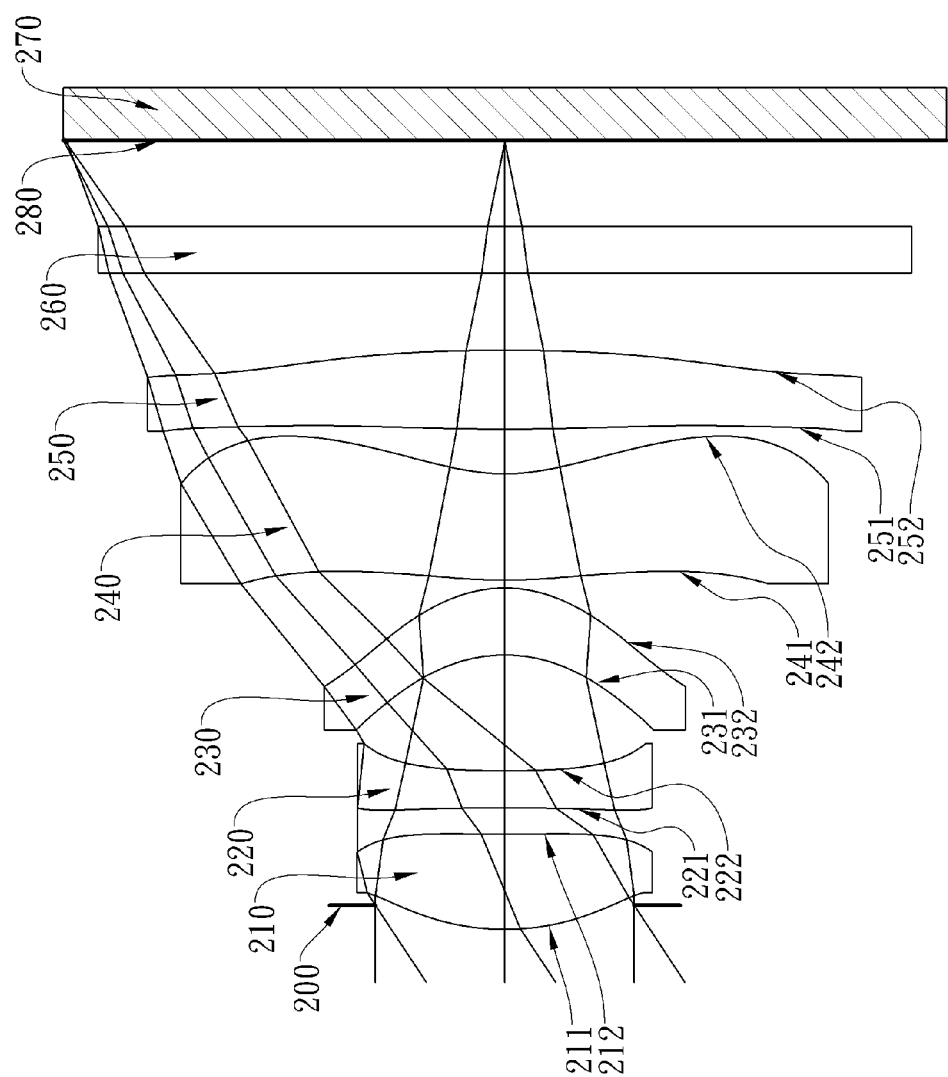
FIG. 2A shows an imaging lens system in accordance with a second embodiment of the present invention.
Figure 2B:
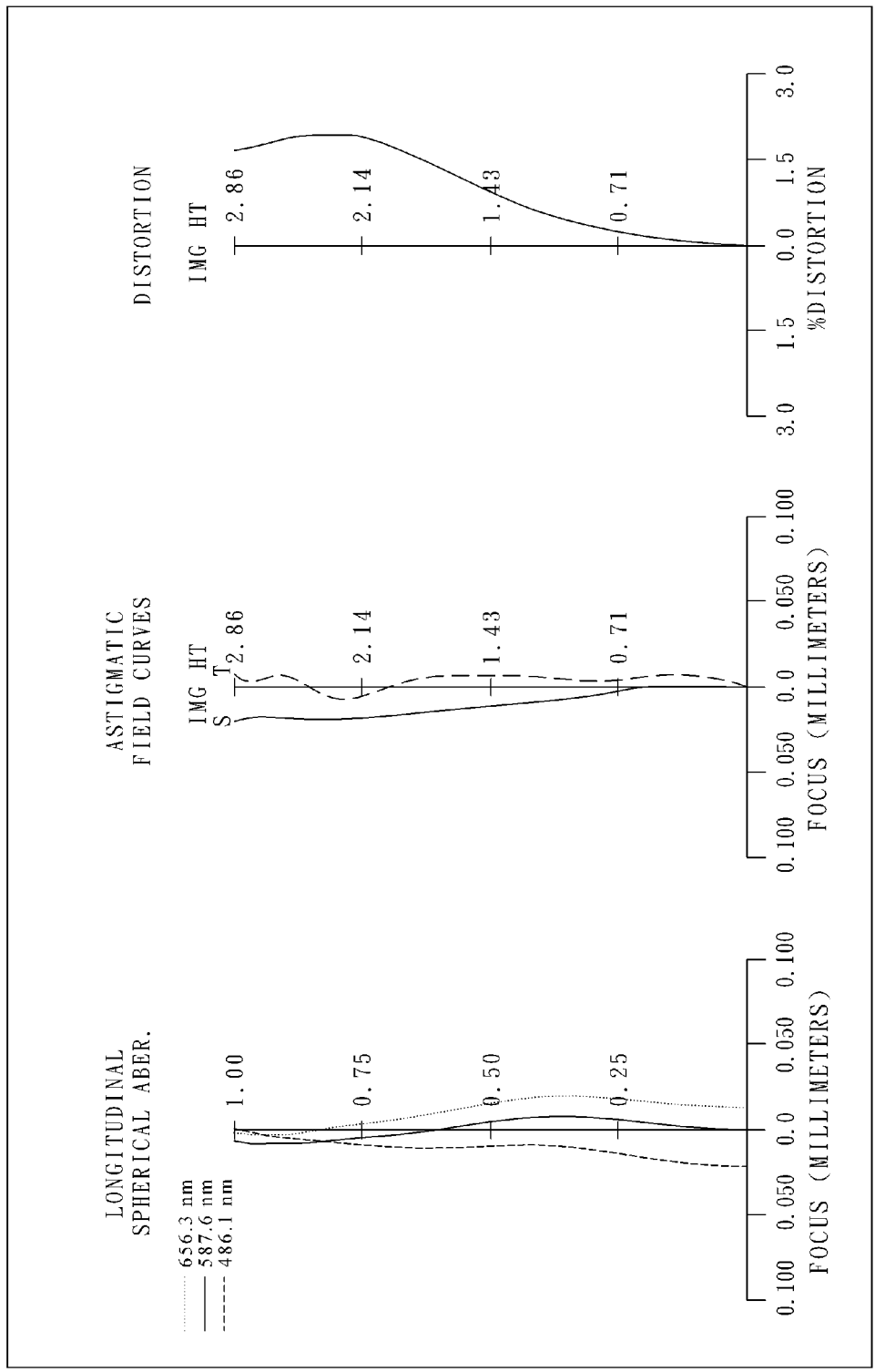
FIG. 2B shows the aberration curves of the second embodiment of the present invention.

FIG. 2A shows an imaging lens system in accordance with the second embodiment of the present invention, and FIG. 2B shows the aberration curves of the second embodiment of the present invention. The imaging lens system of the second embodiment of the present invention comprises five non-cemented lens elements, in order from an object side to an image side:

a first lens element 210 made of plastic with positive refractive power having a convex object-side surface 211 and a concave image-side surface 212, the object-side and image-side surfaces 211 and 212 thereof being aspheric;

a second lens element 220 made of plastic with negative refractive power having a concave object-side surface 221 and a concave image-side surface 222, the object-side and image-side surfaces 221 and 222 thereof being aspheric;

a third lens element 230 made of plastic with positive refractive power having a concave object-side surface 231 and a convex image-side surface 232, the object-side and image-side surfaces 231 and 232 thereof being aspheric;

a fourth lens element 240 made of plastic with negative refractive power having a convex object-side surface 241 and a concave image-side surface 242, the object-side and image-side surfaces 241 and 242 thereof being aspheric, and at least one inflection point is formed on both the object-side surface 241 and the image-side surface 242 thereof; and a fifth lens element 250 made of plastic with positive refractive power having a convex object-side surface 251 and a convex image-side surface 252, the object-side and image-side surfaces 251 and 252 thereof being aspheric;

wherein a stop, can be an aperture stop 200 is disposed between an imaged object and the first lens element 210;

the imaging lens system further comprises an IR filter 260 disposed between the image-side surface 252 of the fifth lens element 250 and an image plane 280, and the IR filter 260 is made of glass and has no influence on the focal length of the imaging lens system; the imaging lens system further comprises an image sensor 270 provided on the image plane 280.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 4.27 mm, Fno = 2.55, HFOV = 33.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.156 | | | | |
| 2 | Lens 1 | 1.540980 | (ASP) | 0.616 | Plastic | 1.544 | 55.9 | 3.06 |
| 3 | | 17.432100 | (ASP) | 0.170 | | | | |
| 4 | Lens 2 | −23.375400 | (ASP) | 0.240 | Plastic | 1.650 | 21.4 | −7.75 |
| 5 | | 6.441100 | (ASP) | 0.751 | | | | |
| 6 | Lens 3 | −0.960210 | (ASP) | 0.434 | Plastic | 1.544 | 55.9 | 5.88 |
| 7 | | −0.856080 | (ASP) | 0.050 | | | | |
| 8 | Lens 4 | 3.084800 | (ASP) | 0.689 | Plastic | 1.544 | 55.9 | −4.57 |
| 9 | | 1.268380 | (ASP) | 0.289 | | | | |
| 10 | Lens 5 | 15.568300 | (ASP) | 0.511 | Plastic | 1.544 | 55.9 | 13.34 |
| 11 | | −13.438700 | (ASP) | 0.500 | | | | |
| 12 | IR-filter | Plano | | 0.300 | Glass | 1.517 | 64.2 | — |
| 13 | | Plano | | 0.557 | | | | |
| 14 | Image | Plano | | — | | | | |

* Reference wavelength is 587.6 nm (d-line)

TABLE 4

Aspheric Coefficients

| | | | Surface # | | |
|---|---|---|---|---|---|
| | 2 | 3 | 4 | 5 | 6 |
| k = | −8.51800E−01 | −1.00000E+00 | −1.00000E+00 | −8.85059E+01 | −4.18476E+00 |
| A4 = | 1.27547E−02 | −1.02863E−01 | −4.15944E−02 | 1.11272E−01 | −3.98601E−01 |
| A6 = | −1.32905E−02 | −4.88372E−02 | 8.29281E−02 | 4.58523E−02 | 1.87222E−01 |
| A8 = | 6.02863E−03 | −5.04314E−03 | −4.17623E−02 | 1.13394E−01 | 1.64963E−01 |
| A10 = | −1.62440E−01 | −3.49738E−02 | −9.57157E−02 | −1.15633E−01 | 1.01572E−02 |
| A12 = | 2.46442E−01 | −3.80431E−03 | 2.24983E−01 | −1.02447E−01 | −5.17703E−01 |
| A14 = | −2.08496E−01 | 6.30067E−02 | −9.07229E−02 | 2.98226E−01 | 6.74499E−01 |
| A16 = | 1.82208E−02 | −5.23746E−02 | −4.37573E−04 | −1.27673E−01 | −3.23450E−01 |

| | | | Surface # | | |
|---|---|---|---|---|---|
| | 7 | 8 | 9 | 10 | 11 |
| k = | −1.34473E+00 | −4.82527E+01 | −7.45465E+00 | −1.61975E+01 | −7.00000E+01 |
| A4 = | −2.88270E−02 | −6.14676E−02 | −5.85691E−02 | −1.12813E−02 | −1.85327E−02 |
| A6 = | −3.98363E−02 | 3.47282E−02 | 1.98032E−02 | −4.35803E−04 | 5.28739E−03 |
| A8 = | 4.74752E−02 | −1.16426E−02 | −6.10426E−03 | 5.26464E−04 | −1.69459E−04 |
| A10 = | 7.36700E−02 | 1.02889E−03 | 7.70721E−04 | 6.73205E−06 | −3.79865E−05 |
| A12 = | −2.34679E−02 | 2.02177E−04 | −8.45191E−06 | −1.16679E−05 | −2.13405E−07 |
| A14 = | −3.93583E−02 | −2.98685E−05 | −6.04899E−06 | | |
| A16 = | 1.67062E−02 | | | | |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5; wherein the unit of HFOV is expressed in degree.

TABLE 5

| Embodiment 2 | | | |
|---|---|---|---|
| f | 4.27 | R8/R9 | 0.08 |
| Fno | 2.55 | f/f1 | 1.39 |
| HFOV | 33.4 | f/f2 | −0.55 |
| V1 − V2 | 34.5 | |f/f3| | 0.73 |
| CT3/T23 | 0.58 | f/f5 | 0.32 |
| (CT2 + CT3)/CT5 | 1.32 | SD/TD | 0.96 |

TABLE 5-continued

| Embodiment 2 | | | |
|---|---|---|---|
| (R3 + R4)/(R3 − R4) | 0.57 | BFL/TTL | 0.27 |
| R7/R8 | 2.43 | TTL/ImgH | 1.75 |

Embodiment 3

Figure 3A:
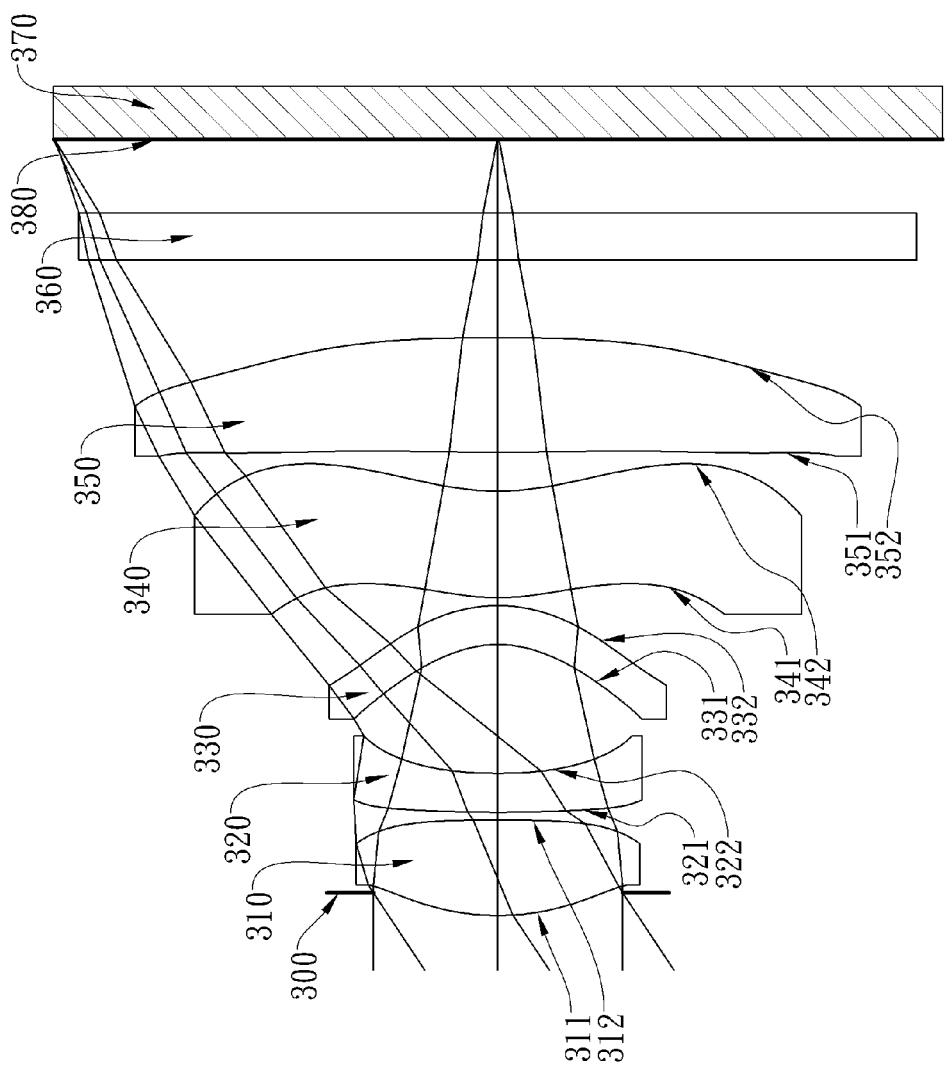
FIG. 3A shows an imaging lens system in accordance with a third embodiment of the present invention.
Figure 3B:
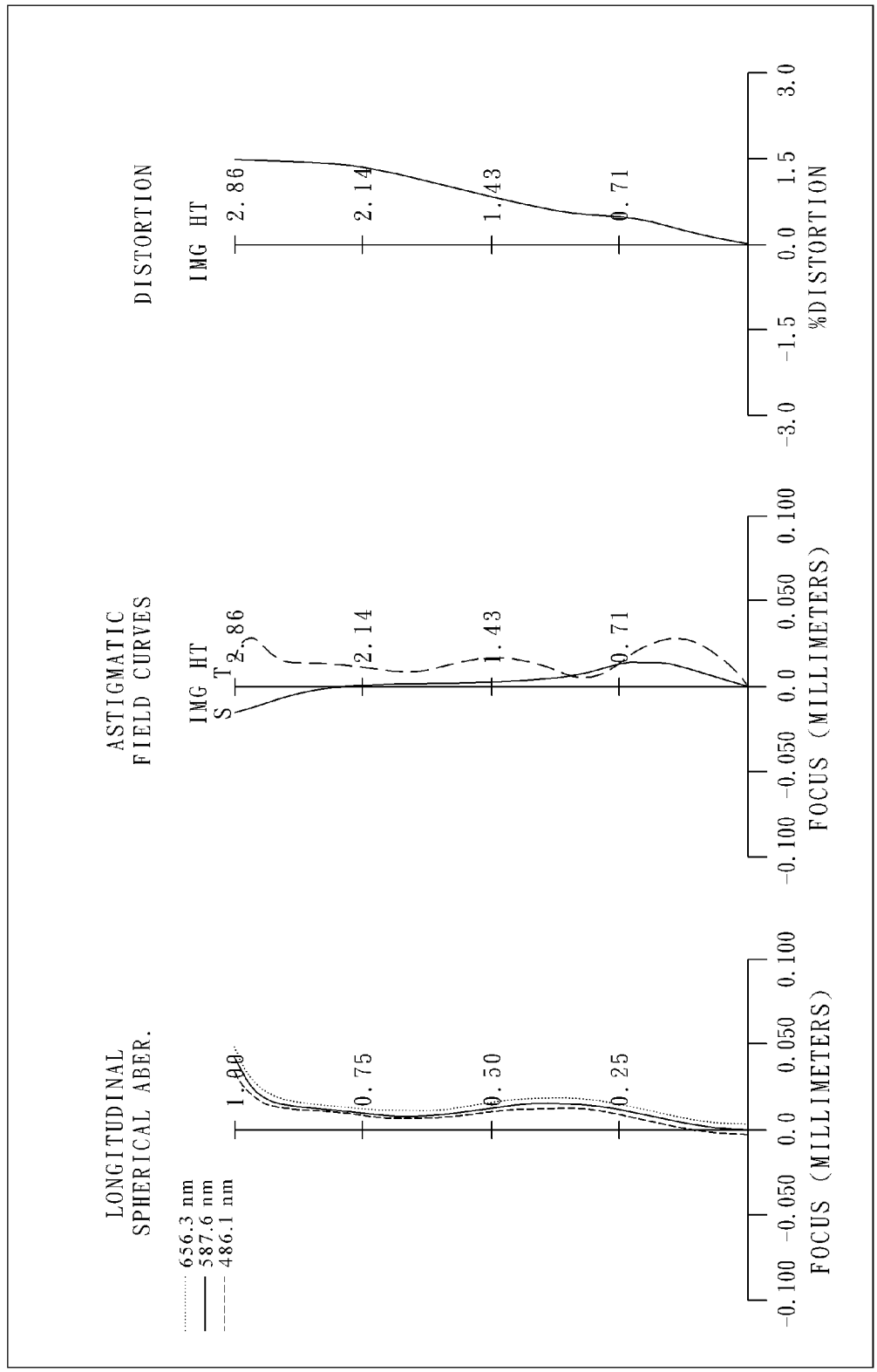
FIG. 3B shows the aberration curves of the third embodiment of the present invention.

FIG. 3A shows an imaging lens system in accordance with the third embodiment of the present invention, and FIG. 3B shows the aberration curves of the third embodiment of the present invention. The imaging lens system of the third embodiment of the present invention comprises five non-cemented lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with negative refractive power having a convex object-side surface 321 and a concave image-side surface 322, the object-side and image-side surfaces 321 and 322 thereof being aspheric;

a third lens element 330 made of plastic with negative refractive power having a concave object-side surface 331 and a convex image-side surface 332, the object-side and image-side surfaces 331 and 332 thereof being aspheric;

a fourth lens element 340 made of plastic with positive refractive power having a convex object-side surface 341 and a concave image-side surface 342, the object-side and image-side surfaces 341 and 342 thereof being aspheric, and at least one inflection point is formed on both the object-side surface 341 and the image-side surface 342 thereof; and a fifth lens element 350 made of plastic with positive refractive power having a convex object-side surface 351 and a convex image-side surface 352, the object-side and image-side surfaces 351 and 352 thereof being aspheric;

wherein a stop, can be an aperture stop 300 is disposed between an imaged object and the first lens element 310;

the imaging lens system further comprises an IR filter 360 disposed between the image-side surface 352 of the fifth lens element 350 and an image plane 380, and the IR filter 360 is made of glass and has no influence on the focal length of the imaging lens system; the imaging lens system further comprises an image sensor 370 provided on the image plane 380.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 4.24 mm, Fno = 2.65, HFOV = 33.5 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Ape. Stop | Plano | −0.148 |  |  |  |  |
| 2 | Lens 1 | 1.513820 (ASP) | 0.614 | Plastic | 1.535 | 56.3 | 2.63 |
| 3 |  | −16.585900 (ASP) | 0.050 |  |  |  |  |
| 4 | Lens 2 | 10.183000 (ASP) | 0.250 | Plastic | 1.634 | 23.8 | −5.80 |
| 5 |  | 2.674970 (ASP) | 0.830 |  |  |  |  |
| 6 | Lens 3 | −0.690640 (ASP) | 0.250 | Plastic | 1.634 | 23.8 | −5.72 |
| 7 |  | −0.972770 (ASP) | 0.050 |  |  |  |  |
| 8 | Lens 4 | 1.347530 (ASP) | 0.686 | Plastic | 1.544 | 55.9 | 8.16 |
| 9 |  | 1.587460 (ASP) | 0.250 |  |  |  |  |
| 10 | Lens 5 | 25.820400 (ASP) | 0.737 | Plastic | 1.535 | 56.3 | 18.83 |
| 11 |  | −16.339900 (ASP) | 0.500 |  |  |  |  |
| 12 | IR-filter | Plano | 0.300 | Glass | 1.517 | 64.2 | — |
| 13 |  | Plano | 0.473 |  |  |  |  |
| 14 | Image | Plano | — |  |  |  |  |

* Reference wavelength is 587.6 nm (d-line)

TABLE 7

Aspheric Coefficients

| Surface # | | | | |
|---|---|---|---|---|
| 2 | 3 | 4 | 5 | 6 |

| | 2 | 3 | 4 | 5 | 6 |
|---|---|---|---|---|---|
| k = | −1.15862E+00 | 2.88672E+00 | 2.95785E+00 | −8.44812E−01 | −4.54291E+00 |
| A4 = | 9.86562E−03 | −1.23067E−01 | 2.95612E−03 | 1.31051E−01 | −4.38869E−01 |
| A6 = | −1.94911E−02 | −4.19284E−02 | 1.26343E−02 | 1.54739E−02 | 3.27439E−01 |
| A8 = | −5.22519E−02 | −2.19186E−02 | −1.26335E−02 | 9.02303E−02 | 8.54154E−02 |
| A10 = | −1.17855E−01 | −3.07602E−02 | −7.05170E−02 | −1.15690E−01 | −8.43531E−02 |
| A12 = | 1.61659E−01 | 8.40776E−03 | 2.85176E−01 | −1.72842E−02 | −3.83334E−01 |
| A14 = | −1.47920E−01 | 6.45731E−02 | −1.16422E−01 | 2.74901E−01 | 6.97881E−01 |
| A16 = | −4.70789E−02 | −7.40079E−02 | −2.18195E−02 | −9.75137E−02 | −4.22205E−01 |

| Surface # | | | | |
|---|---|---|---|---|
| 7 | 8 | 9 | 10 | 11 |

| | 7 | 8 | 9 | 10 | 11 |
|---|---|---|---|---|---|
| k = | −1.28870E+00 | −1.63212E+01 | −7.01849E+00 | −1.00000E+00 | −1.00000E+00 |
| A4 = | −5.62199E−02 | −1.32922E−01 | −7.61412E−02 | −1.75998E−02 | −2.98901E−02 |
| A6 = | −3.73914E−03 | 4.64039E−02 | 2.16208E−02 | 3.22757E−03 | 4.91235E−03 |
| A8 = | 7.74361E−02 | −1.16172E−02 | −6.42259E−03 | 3.05365E−04 | 2.86462E−04 |
| A10 = | 6.25459E−02 | −1.50765E−03 | 7.58960E−04 | −3.73619E−05 | −4.06641E−05 |
| A12 = | −3.92733E−02 | −4.32811E−04 | −2.88259E−06 | −1.15524E−05 | −9.17646E−06 |
| A14 = | −4.26710E−02 | 4.90455E−04 | −6.24804E−06 |  |  |
| A16 = | 2.06193E−02 |  |  |  |  |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8; wherein the unit of HFOV is expressed in degree.

TABLE 8

Embodiment 3

| f | 4.24 | R8/R9 | 0.06 |
|---|---|---|---|
| Fno | 2.65 | f/f1 | 1.62 |
| HFOV | 33.5 | f/f2 | −0.73 |
| V1 − V2 | 32.5 | |f/f3| | 0.74 |
| CT3/T23 | 0.30 | f/f5 | 0.23 |
| (CT2 + CT3)/CT5 | 0.68 | SD/TD | 0.96 |
| (R3 + R4)/(R3 − R4) | 1.71 | BFL/TTL | 0.26 |
| R7/R8 | 0.85 | TTL/ImgH | 1.71 |

Embodiment 4

Figure 4A:
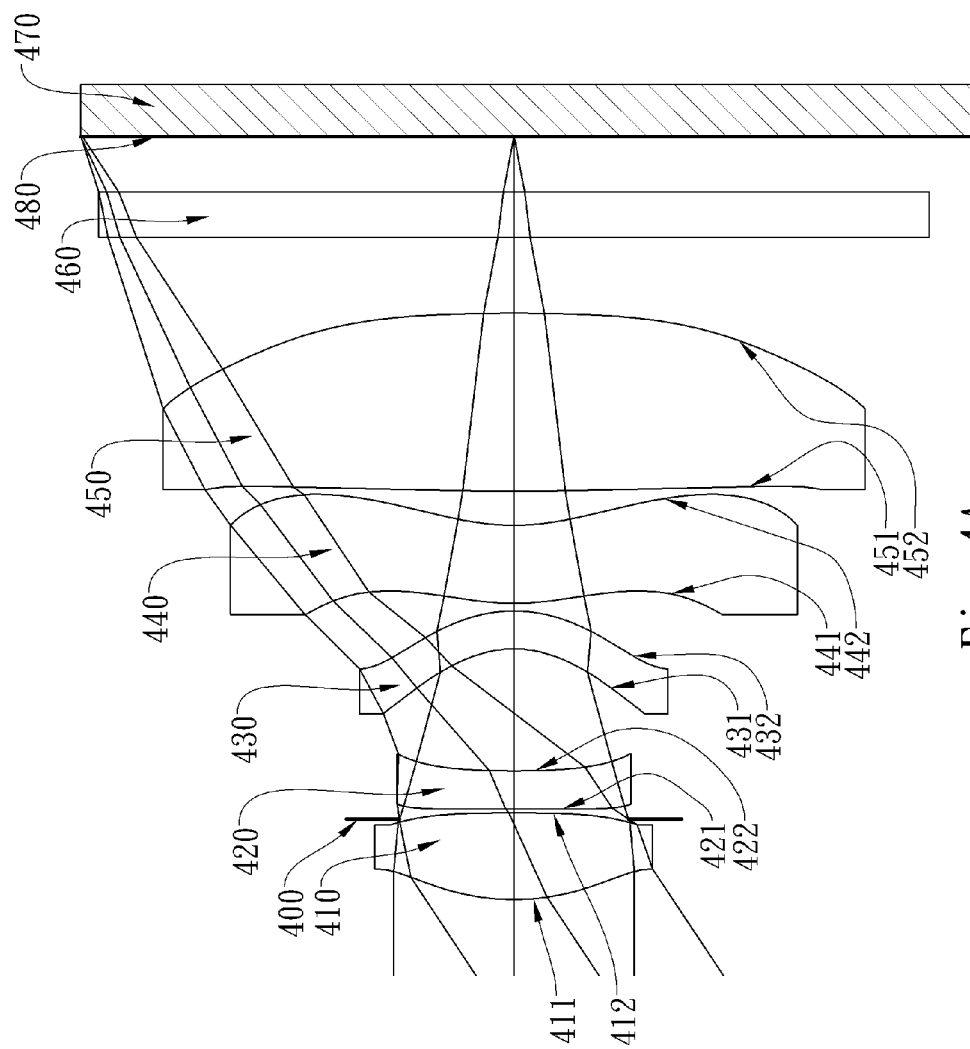
FIG. 4A shows an imaging lens system in accordance with a fourth embodiment of the present invention.
Figure 4B:
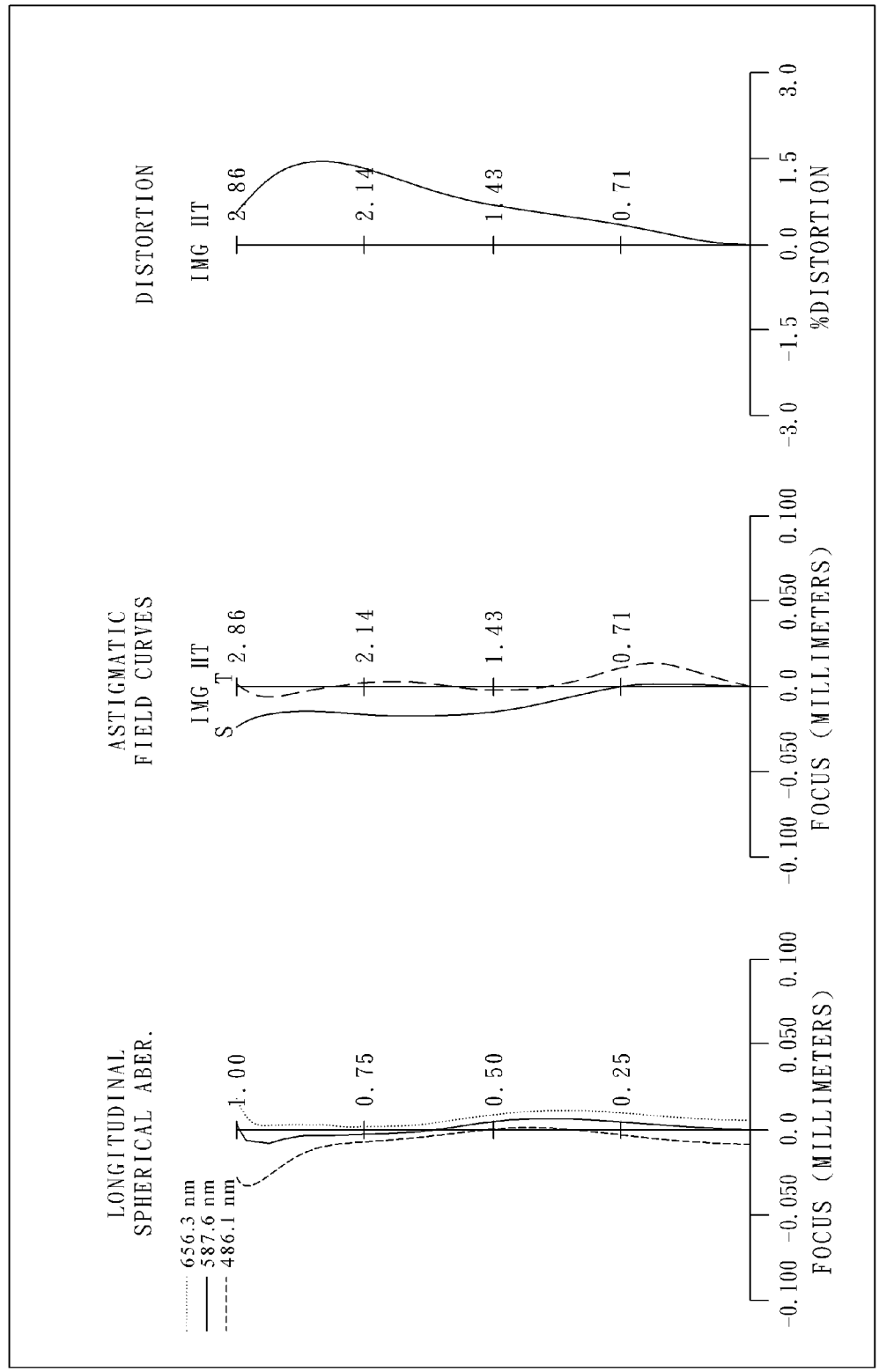
FIG. 4B shows the aberration curves of the fourth embodiment of the present invention.

FIG. 4A shows an imaging lens system in accordance with the fourth embodiment of the present invention, and FIG. 4B shows the aberration curves of the fourth embodiment of the present invention. The imaging lens system of the fourth embodiment of the present invention comprises five non-cemented lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a concave image-side surface 422, the object-side and image-side surfaces 421 and 422 thereof being aspheric;

a third lens element 430 made of plastic with negative refractive power having a concave object-side surface 431 and a convex image-side surface 432, the object-side and image-side surfaces 431 and 432 thereof being aspheric;

a fourth lens element 440 made of plastic with positive refractive power having a convex object-side surface 441 and a concave image-side surface 442, the object-side and image-side surfaces 441 and 442 thereof being aspheric, and at least one inflection point is formed on both the object-side surface 441 and the image-side surface 442 thereof; and a fifth lens element 450 made of plastic with positive refractive power having a convex object-side surface 451 and a convex image-side surface 452, the object-side and image-side surfaces 451 and 452 thereof being aspheric;

wherein a stop, can be an aperture stop 400 is disposed between the first lens element 410 and the second lens element 420;

the imaging lens system further comprises an IR filter 460 disposed between the image-side surface 452 of the fifth lens element 450 and an image plane 480, and the IR filter 460 is made of glass and has no influence on the focal length of the imaging lens system; the imaging lens system further comprises an image sensor 470 provided on the image plane 480.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 4.28 mm, Fno = 2.70, HFOV = 33.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.490570 | (ASP) | 0.571 | Plastic | 1.544 | 55.9 | 2.58 |
| 2 | | −20.474900 | (ASP) | −0.040 | | | | |
| 3 | Ape. Stop | Plano | | 0.067 | | | | |
| 4 | Lens 2 | −36.363600 | (ASP) | 0.250 | Plastic | 1.640 | 23.3 | −7.72 |
| 5 | | 5.731800 | (ASP) | 0.806 | | | | |
| 6 | Lens 3 | −0.698130 | (ASP) | 0.250 | Plastic | 1.640 | 23.3 | −7.00 |
| 7 | | −0.942600 | (ASP) | 0.050 | | | | |
| 8 | Lens 4 | 1.561530 | (ASP) | 0.515 | Plastic | 1.544 | 55.9 | 31.30 |
| 9 | | 1.519370 | (ASP) | 0.225 | | | | |
| 10 | Lens 5 | 18.319300 | (ASP) | 1.173 | Plastic | 1.535 | 56.3 | 16.35 |
| 11 | | −16.339900 | (ASP) | 0.500 | | | | |
| 12 | IR-filter | Plano | | 0.300 | Glass | 1.517 | 64.2 | — |
| 13 | | Plano | | 0.365 | | | | |
| 14 | Image | Plano | | — | | | | |

* Reference wavelength is 587.6 nm (d-line)

TABLE 10

Aspheric Coefficients

| | Surface # | | | | |
|---|---|---|---|---|---|
| | 1 | 2 | 4 | 5 | 6 |
| k = | −1.14628E+00 | 2.00000E+00 | 2.00000E+00 | −1.70848E+01 | −3.75679E+00 |
| A4 = | 8.74161E−03 | −1.58894E−01 | 1.07720E−02 | 1.41569E−01 | −4.69421E−01 |
| A6 = | −4.41489E−02 | 2.85836E−02 | 1.13794E−01 | 4.22150E−02 | 3.89737E−01 |
| A8 = | −2.56715E−02 | 4.13849E−02 | 6.73538E−02 | 4.64074E−02 | 1.18511E−01 |
| A10 = | −1.62740E−01 | −7.20484E−02 | −9.21614E−03 | −1.13712E−02 | −1.11534E−01 |
| A12 = | 1.06815E−01 | −3.66919E−02 | 7.96501E−02 | −1.23555E−02 | −3.56704E−01 |

TABLE 10-continued

| Aspheric Coefficients | | | | | |
|---|---|---|---|---|---|
| A14 = | −1.66917E−01 | −2.05971E−02 | −1.89329E−02 | 2.66116E−01 | 7.31592E−01 |
| A16 = | 1.37499E−01 | 9.68582E−02 | −2.18201E−02 | −9.75143E−02 | −5.05161E−01 |

| | Surface # | | | | |
|---|---|---|---|---|---|
| | 7 | 8 | 9 | 10 | 11 |
| k = | −1.39911E+00 | −1.68907E+01 | −6.04694E+00 | −1.00000E+00 | −1.00000E+00 |
| A4 = | −4.16308E−02 | −1.19029E−01 | −7.59055E−02 | −1.39717E−02 | −2.71239E−02 |
| A6 = | 2.46055E−02 | 2.21455E−02 | 2.37867E−02 | 4.08687E−03 | 3.73318E−04 |
| A8 = | 1.15760E−01 | −6.52836E−03 | −7.29591E−03 | −1.82157E−04 | 7.28919E−04 |
| A10 = | 7.45320E−02 | −7.34246E−05 | 1.04230E−03 | −7.50202E−05 | −1.94383E−05 |
| A12 = | −4.51605E−02 | −1.54276E−04 | 3.12225E−05 | −1.79268E−06 | −1.09546E−05 |
| A14 = | −5.21210E−02 | 3.71103E−04 | −2.92266E−05 | | |
| A16 = | 2.37105E−02 | | | | |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11; wherein the unit of HFOV is expressed in degree.

TABLE 11

| Embodiment 4 | | | |
|---|---|---|---|
| f | 4.28 | R8/R9 | 0.08 |
| Fno | 2.70 | f/f1 | 1.66 |
| HFOV | 33.6 | f/f2 | −0.56 |
| V1 − V2 | 32.6 | |f/f3| | 0.61 |
| CT3/T23 | 0.31 | f/f5 | 0.26 |
| (CT2 + CT3)/CT5 | 0.43 | SD/TD | 0.86 |
| (R3 + R4)/(R3 − R4) | 0.73 | BFL/TTL | 0.23 |
| R7/R8 | 1.03 | TTL/ImgH | 1.73 |

Embodiment 5

Figure 5A:
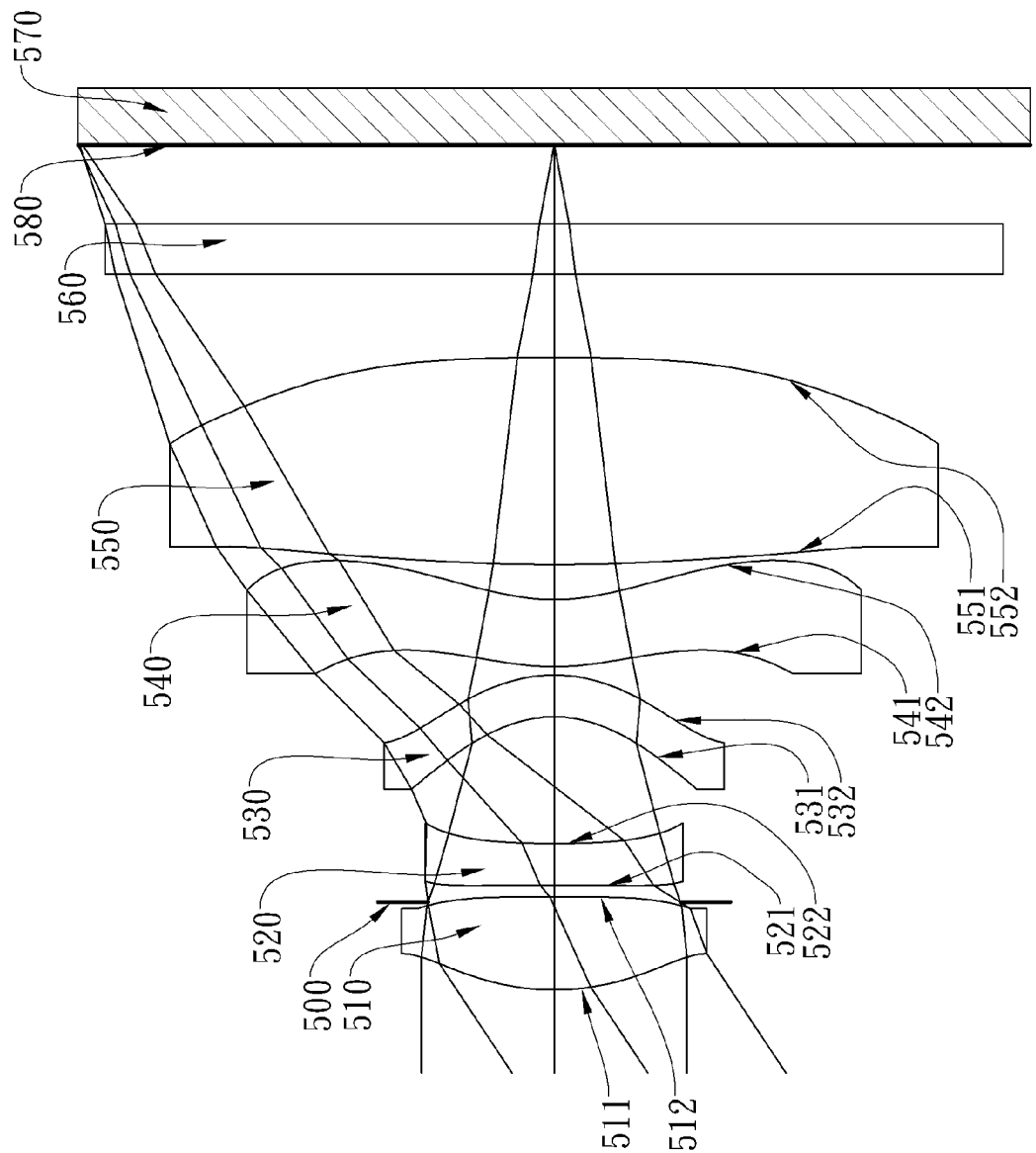
FIG. 5A shows an imaging lens system in accordance with a fifth embodiment of the present invention.
Figure 5B:
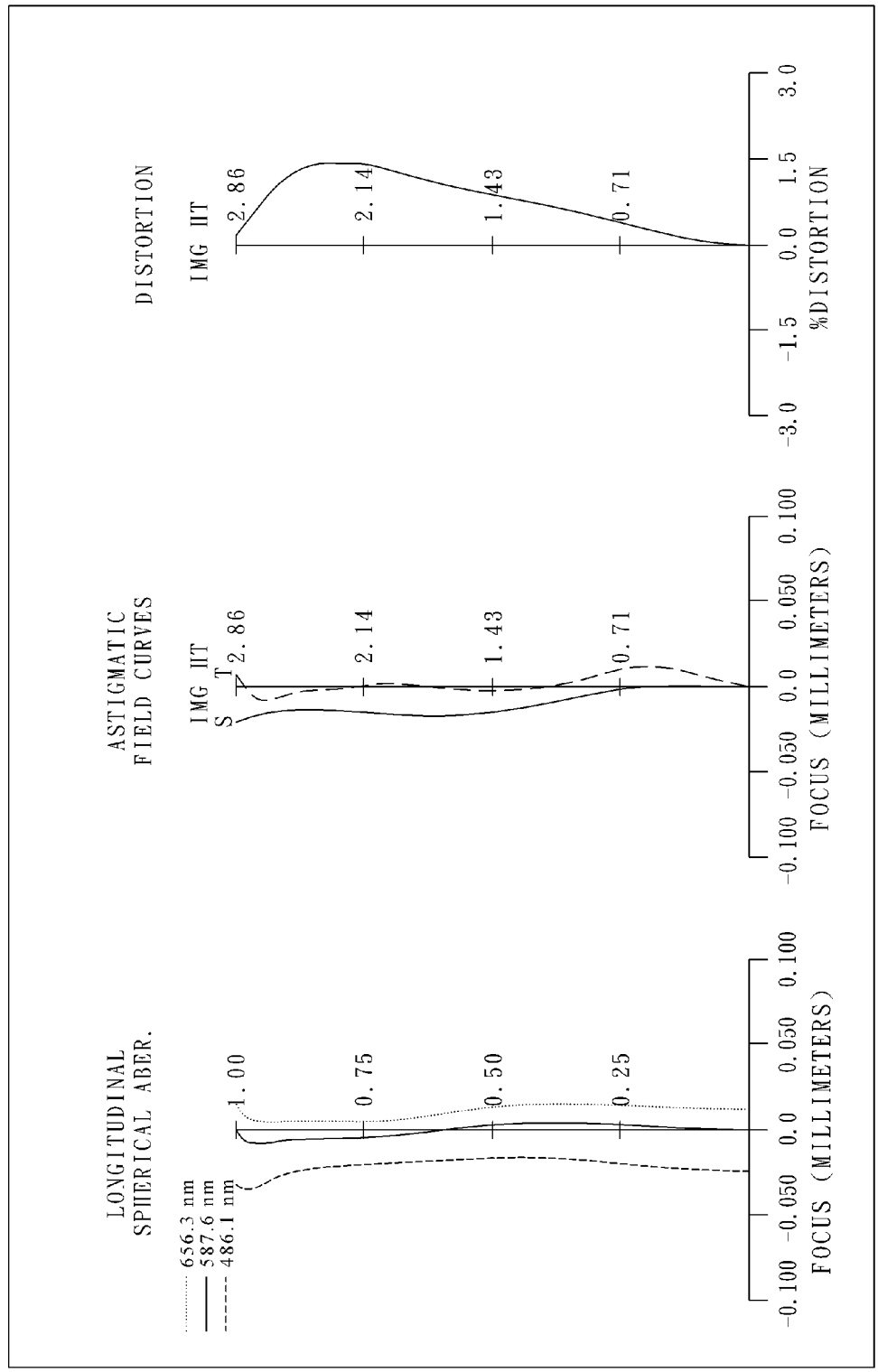
FIG. 5B shows the aberration curves of the fifth embodiment of the present invention.

FIG. 5A shows an imaging lens system in accordance with the fifth embodiment of the present invention, and FIG. 5B shows the aberration curves of the fifth embodiment of the present invention. The imaging lens system of the fifth embodiment of the present invention comprises five non-cemented lens elements, in order from an object side to an image side:

a first lens element 510 made of plastic with positive refractive power having a convex object-side surface 511 and a concave image-side surface 512, the object-side and image-side surfaces 511 and 512 thereof being aspheric;

a second lens element 520 made of plastic with negative refractive power having a concave object-side surface 521 and a concave image-side surface 522, the object-side and image-side surfaces 521 and 522 thereof being aspheric;

a third lens element 530 made of plastic with negative refractive power having a concave object-side surface 531 and a convex image-side surface 532, the object-side and image-side surfaces 531 and 532 thereof being aspheric;

a fourth lens element 540 made of plastic with negative refractive power having a convex object-side surface 541 and a concave image-side surface 542, the object-side and image-side surfaces 541 and 542 thereof being aspheric, and at least one inflection point is formed on both the object-side surface 541 and the image-side surface 542 thereof; and a fifth lens element 550 made of plastic with positive refractive power having a convex object-side surface 551 and a convex image-side surface 552, the object-side and image-side surfaces 551 and 552 thereof being aspheric;

wherein a stop, can be an aperture stop 500 is disposed between the first lens element 510 and the second lens element 520.

the imaging lens system further comprises an IR filter 560 disposed between the image-side surface 552 of the fifth lens element 550 and an image plane 580, and the IR filter 560 is made of glass and has no influence on the focal length of the imaging lens system; the imaging lens system further comprises an image sensor 570 provided on the image plane 580.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

| (Embodiment 5) f = 4.30 mm, Fno = 2.70, HFOV = 33.5 deg. | | | | | | | |
|---|---|---|---|---|---|---|---|
| Surface # | | Curvature Radius | Thickness | Material | Index | Abbe # | Focal length |
| 0 | Object | Plano | Infinity | | | | |
| 1 | Lens 1 | 1.455970 (ASP) | 0.557 | Plastic | 1.544 | 55.9 | 2.73 |
| 2 | | 67.672600 (ASP) | −0.031 | | | | |
| 3 | Ape. Stop | Plano | 0.101 | | | | |
| 4 | Lens 2 | −70.655400 (ASP) | 0.250 | Plastic | 1.607 | 26.6 | −8.08 |
| 5 | | 5.280400 (ASP) | 0.762 | | | | |
| 6 | Lens 3 | −0.707050 (ASP) | 0.250 | Plastic | 1.607 | 26.6 | −11.01 |
| 7 | | −0.896300 (ASP) | 0.050 | | | | |
| 8 | Lens 4 | 1.458910 (ASP) | 0.403 | Plastic | 1.544 | 55.9 | −54.44 |
| 9 | | 1.255080 (ASP) | 0.210 | | | | |
| 10 | Lens 5 | 9.853200 (ASP) | 1.244 | Plastic | 1.535 | 56.3 | 11.69 |

TABLE 12-continued (Embodiment 5)
f = 4.30 mm, Fno = 2.70, HFOV = 33.5 deg.

| Surface # | | Curvature Radius | Thickness | Material | Index | Abbe # | Focal length |
|---|---|---|---|---|---|---|---|
| 11 | | −16.339900 (ASP) | 0.500 | | | | |
| 12 | IR-filter | Plano | 0.300 | Glass | 1.517 | 64.2 | |
| 13 | | Plano | 0.474 | | | | |
| 14 | Image | Plano | — | | | | |

\* Reference wavelength is 587.6 nm (d-line)

TABLE 13

Aspheric Coefficients

| | Surface # | | | | |
|---|---|---|---|---|---|
| | 1 | 2 | 4 | 5 | 6 |
| k = | −1.03171E+00 | −3.00000E+01 | 2.00000E+00 | −4.37322E+01 | −3.71154E+00 |
| A4 = | 1.28379E−02 | −1.84331E−01 | −6.06882E−02 | 1.30378E−01 | −4.91334E−01 |
| A6 = | −4.32973E−02 | 2.62840E−02 | 1.91746E−01 | 1.03269E−01 | 4.15264E−01 |
| A8 = | −9.55090E−03 | 5.19834E−02 | 7.80026E−02 | 1.25130E−01 | 7.68367E−02 |
| A10 = | −1.54379E−01 | −5.70948E−02 | −6.13299E−02 | −2.62965E−01 | −1.17416E−01 |
| A12 = | 9.50216E−02 | −1.88567E−02 | 1.85947E−02 | 1.95358E−01 | −2.73763E−01 |
| A14 = | −1.70697E−01 | −1.16027E−01 | 8.16199E−02 | 2.66116E−01 | 6.35403E−01 |
| A16 = | 1.23391E−01 | 1.51574E−01 | −2.18200E−02 | −9.75142E−02 | −5.05161E−01 |

| | Surface # | | | | |
|---|---|---|---|---|---|
| | 7 | 8 | 9 | 10 | 11 |
| k = | −1.67013E+00 | −1.35873E+01 | −6.17979E+00 | −1.00000E+00 | −1.00000E+00 |
| A4 = | −5.77987E−02 | −1.10712E−01 | −7.33291E−02 | −1.49206E−02 | −2.09256E−02 |
| A6 = | 5.53077E−03 | 2.40391E−02 | 2.29828E−02 | 4.46832E−03 | −4.74255E−04 |
| A8 = | 1.34293E−01 | −7.81087E−03 | −7.21344E−03 | −3.17673E−04 | 7.38416E−04 |
| A10 = | 7.96803E−02 | 1.01124E−03 | 1.08855E−03 | −5.68749E−05 | −1.60642E−05 |
| A12 = | −6.08277E−02 | 1.77092E−04 | 3.19339E−05 | −9.43226E−07 | −9.57023E−06 |
| A14 = | −6.59074E−02 | 7.84587E−06 | −3.47206E−05 | | |
| A16 = | 3.63124E−02 | | | | |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14; wherein the unit of HFOV is expressed in degree.

TABLE 14

(Embodiment 5)

| f | 4.30 | R8/R9 | 0.13 |
|---|---|---|---|
| Fno | 2.70 | f/f1 | 1.58 |
| HFOV | 33.5 | f/f2 | −0.53 |
| V1 − V2 | 29.3 | |f/f3| | 0.39 |
| CT3/T23 | 0.33 | f/f5 | 0.37 |
| (CT2 + CT3)/CT5 | 0.40 | SD/TD | 0.86 |
| (R3 + R4)/(R3 − R4) | 0.86 | BFL/TTL | 0.25 |
| R7/R8 | 1.16 | TTL/ImgH | 1.74 |

Embodiment 6

Figure 6A:
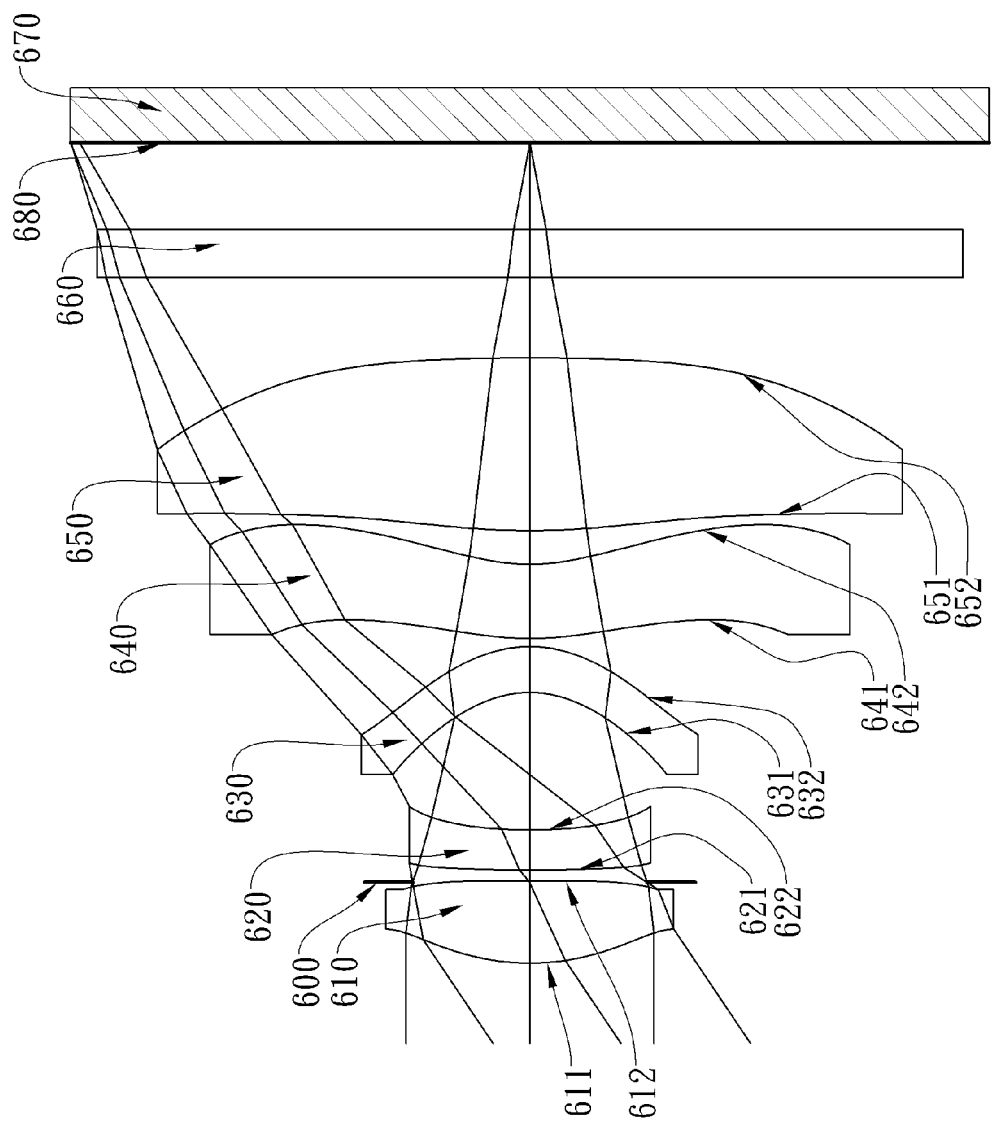
FIG. 6A shows an imaging lens system in accordance with a sixth embodiment of the present invention.
Figure 6B:
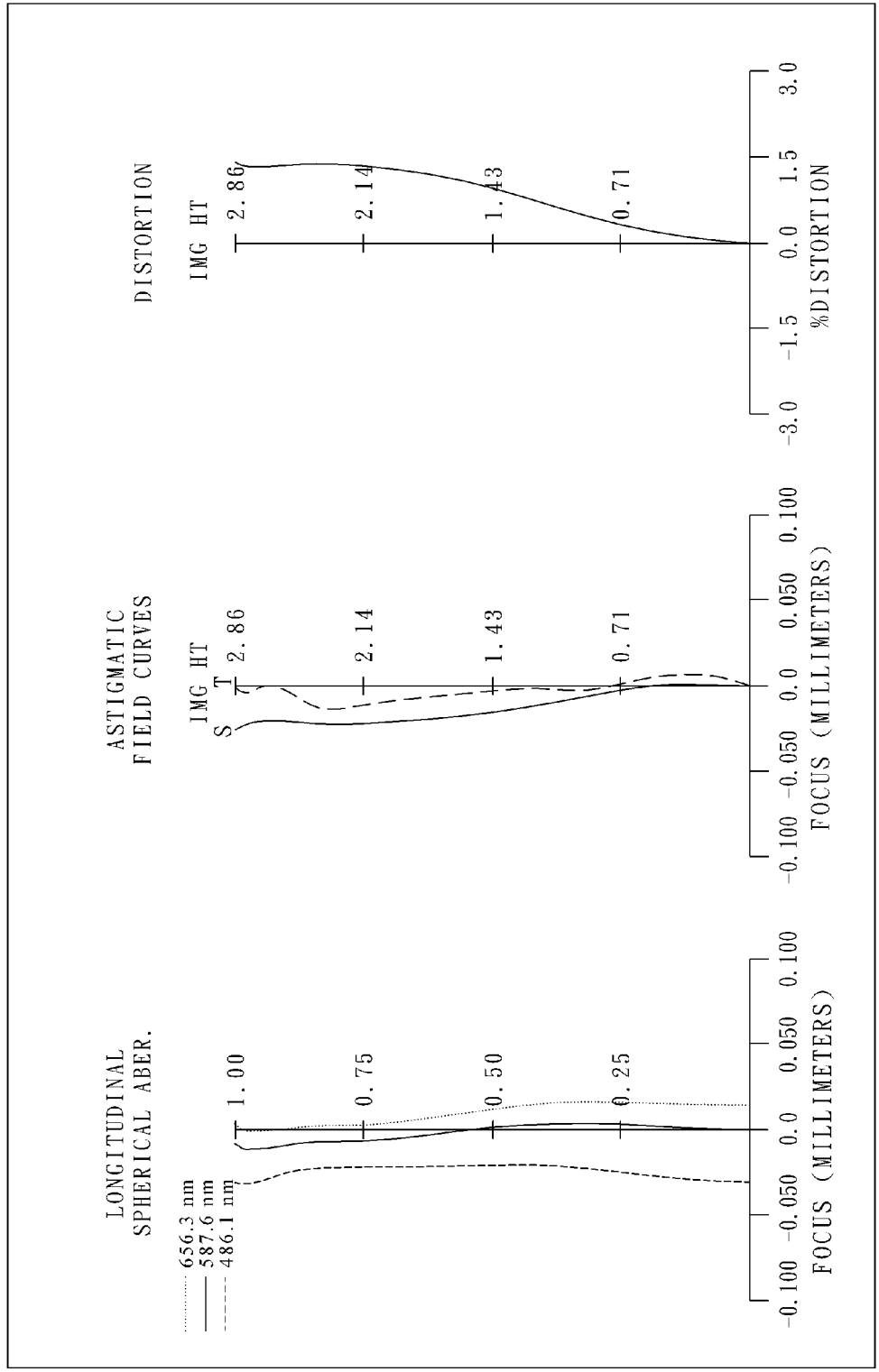
FIG. 6B shows the aberration curves of the sixth embodiment of the present invention.

FIG. 6A shows an imaging lens system in accordance with the sixth embodiment of the present invention, and FIG. 6B shows the aberration curves of the sixth embodiment of the present invention. The imaging lens system of the sixth embodiment of the present invention comprises five non-cemented lens elements, in order from an object side to an image side:

a first lens element 610 made of plastic with positive refractive power having a convex object-side surface 611 and a concave image-side surface 612, the object-side and image-side surfaces 611 and 612 thereof being aspheric;

a second lens element 620 made of plastic with negative refractive power having a convex object-side surface 621 and a concave image-side surface 622, the object-side and image-side surfaces 621 and 622 thereof being aspheric;

a third lens element 630 made of plastic with negative refractive power having a concave object-side surface 631 and a convex image-side surface 632, the object-side and image-side surfaces 631 and 632 thereof being aspheric;

a fourth lens element 640 made of plastic with negative refractive power having a convex object-side surface 641 and a concave image-side surface 642, the object-side and image-side surfaces 641 and 642 thereof being aspheric, and at least one inflection point is formed on both the object-side surface 641 and the image-side surface 642 thereof; and a fifth lens element 650 made of plastic with positive refractive power having a convex object-side surface 651 and a convex image-side surface 652, the object-side and image-side surfaces 651 and 652 thereof being aspheric;

wherein a stop, can be an aperture stop 600 is disposed between the first lens element 610 and the second lens element 620;

the imaging lens system further comprises an IR filter 660 disposed between the image-side surface 652 of the fifth lens element 650 and an image plane 680, and the IR filter 660 is made of glass and has no influence on the focal length of the imaging lens system; the imaging lens system further comprises an image sensor 670 provided on the image plane 680.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 4.20 mm, Fno = 2.75, HFOV = 33.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.454650 | (ASP) | 0.509 | Plastic | 1.544 | 55.9 | 2.91 |
| 2 | | 15.931300 | (ASP) | −0.007 | | | | |
| 3 | Ape. Stop | Plano | | 0.077 | | | | |
| 4 | Lens 2 | 8.331600 | (ASP) | 0.250 | Plastic | 1.607 | 26.6 | −8.32 |
| 5 | | 3.109300 | (ASP) | 0.856 | | | | |
| 6 | Lens 3 | −0.660870 | (ASP) | 0.286 | Plastic | 1.607 | 26.6 | −109.35 |
| 7 | | −0.776660 | (ASP) | 0.050 | | | | |
| 8 | Lens 4 | 1.778140 | (ASP) | 0.462 | Plastic | 1.607 | 26.6 | −8.59 |
| 9 | | 1.195870 | (ASP) | 0.210 | | | | |
| 10 | Lens 5 | 4.345000 | (ASP) | 1.075 | Plastic | 1.544 | 55.9 | 6.45 |
| 11 | | −16.611300 | (ASP) | 0.500 | | | | |
| 12 | IR-filter | Plano | | 0.300 | Glass | 1.517 | 64.2 | — |
| 13 | | Plano | | 0.538 | | | | |
| 14 | Image | Plano | | — | | | | |

* Reference wavelength is 587.6 nm (d-line)

TABLE 16

Aspheric Coefficients

| | Surface # | | | | |
|---|---|---|---|---|---|
| | 1 | 2 | 4 | 5 | 6 |
| k = | −1.01313E+00 | −3.00000E+01 | −3.00000E+01 | −1.34042E+01 | −3.10013E+00 |
| A4 = | 1.35557E−02 | −1.98987E−01 | −9.66825E−02 | 1.31330E−01 | −5.28662E−01 |
| A6 = | −4.72198E−02 | 5.28793E−02 | 2.16601E−01 | 9.68137E−02 | 4.07851E−01 |
| A8 = | −1.31727E−02 | 3.85979E−02 | 7.43614E−02 | 1.66080E−01 | 2.53533E−02 |
| A10 = | −1.51245E−01 | −9.80546E−02 | −1.10349E−01 | −3.31201E−01 | −1.45390E−01 |
| A12 = | 9.52776E−02 | −4.00823E−02 | 6.54523E−02 | 2.39550E−01 | −2.39178E−01 |
| A14 = | −1.83841E−01 | −4.23530E−02 | 8.43401E−02 | 2.66093E−01 | 5.65601E−01 |
| A16 = | 1.26129E−01 | 1.43070E−01 | −2.18332E−02 | −9.75437E−02 | −5.05166E−01 |

| | Surface # | | | | |
|---|---|---|---|---|---|
| | 7 | 8 | 9 | 10 | 11 |
| k = | −1.90646E+00 | −1.93358E+01 | −8.49252E+00 | −1.00000E+00 | −1.00000E+00 |
| A4 = | −9.63617E−02 | −6.24137E−02 | −5.57215E−02 | −4.92804E−02 | −1.25620E−02 |
| A6 = | −3.28896E−02 | 2.95800E−02 | 2.17003E−02 | 8.55641E−03 | −2.90219E−03 |
| A8 = | 1.25193E−01 | −1.20092E−02 | −7.27913E−03 | −1.46110E−04 | 6.33877E−04 |
| A10 = | 7.55696E−02 | 8.95985E−04 | 9.82452E−04 | −7.15110E−05 | 8.73589E−06 |
| A12 = | −7.36015E−02 | 3.28747E−04 | 3.44888E−05 | −4.37824E−07 | −6.90706E−06 |
| A14 = | −6.72300E−02 | −3.29302E−05 | −1.54849E−05 | | |
| A16 = | 4.88982E−02 | | | | |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17; wherein the unit of HFOV is expressed in degree.

TABLE 17

(Embodiment 6)

| f | 4.20 | R8/R9 | 0.28 |
|---|---|---|---|
| Fno | 2.75 | f/f1 | 1.45 |
| HFOV | 33.9 | f/f2 | −0.51 |
| V1 − V2 | 29.3 | |f/f3| | 0.04 |

TABLE 17-continued (Embodiment 6)

| CT3/T23 | 0.33 | f/f5 | 0.65 |
|---|---|---|---|
| (CT2 + CT3)/CT5 | 0.50 | SD/TD | 0.87 |
| (R3 + R4)/(R3 − R4) | 2.19 | BFL/TTL | 0.26 |
| R7/R8 | 1.49 | TTL/ImgH | 1.75 |

Embodiment 7

Figure 7A:
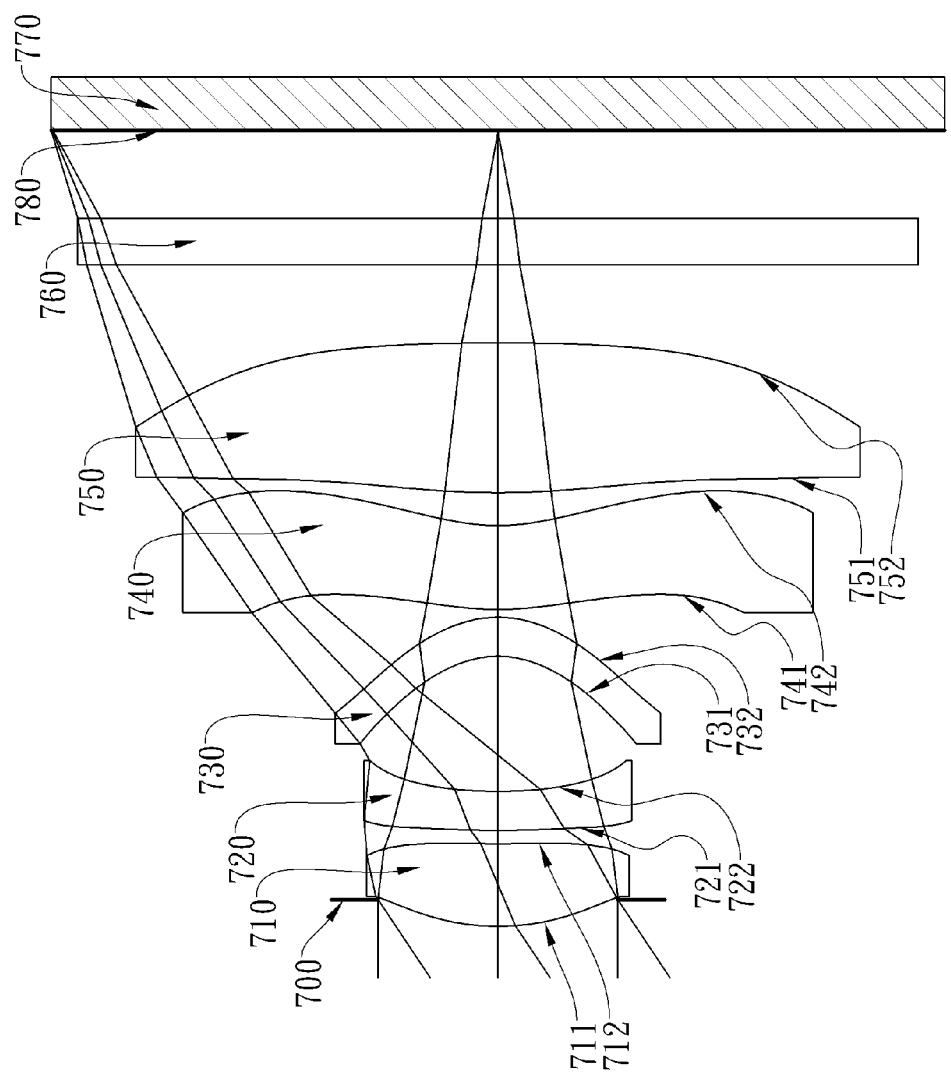
FIG. 7A shows an imaging lens system in accordance with a seventh embodiment of the present invention.
Figure 7B:
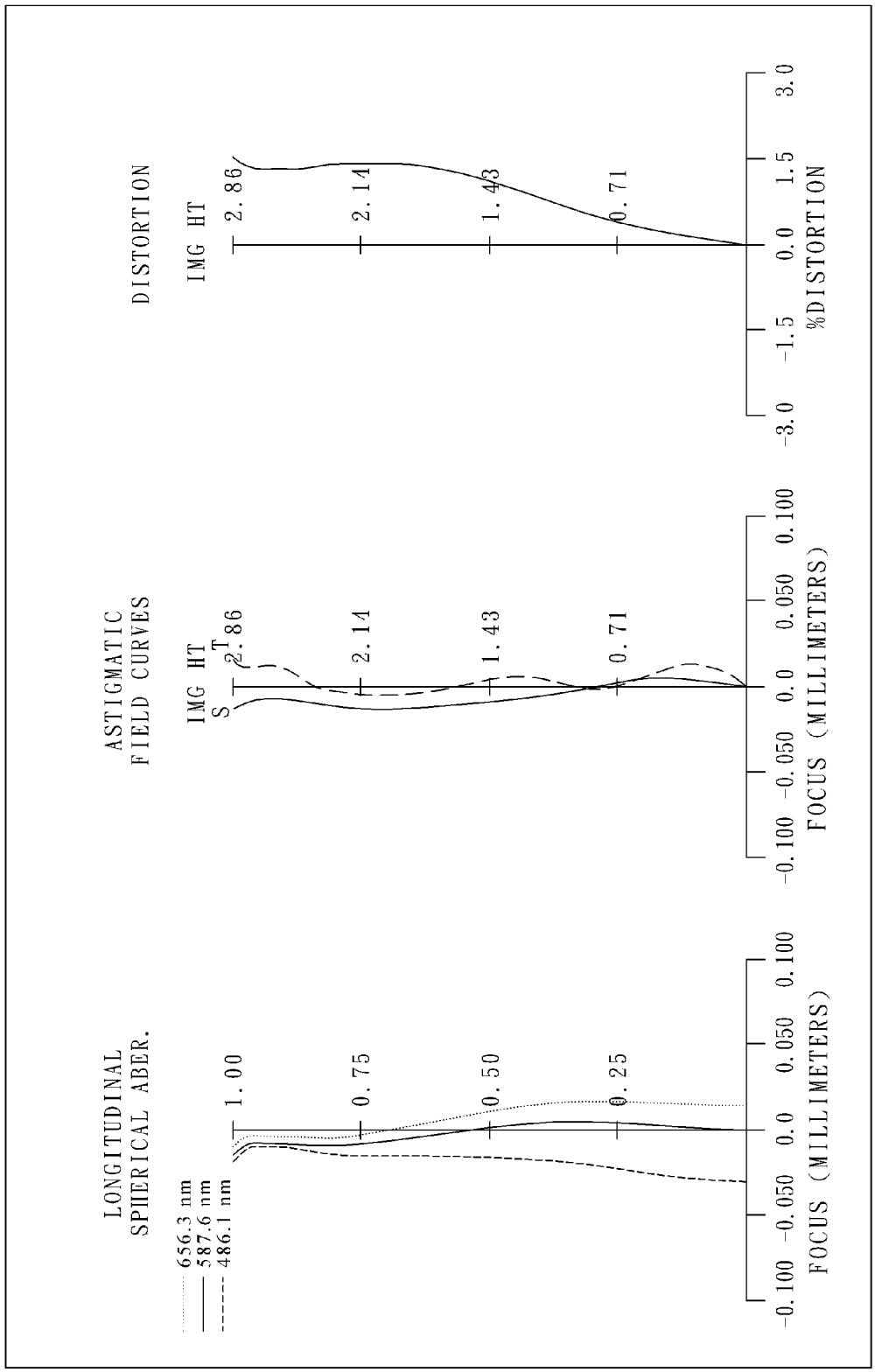
FIG. 7B shows the aberration curves of the seventh embodiment of the present invention.

FIG. 7A shows an imaging lens system in accordance with the seventh embodiment of the present invention, and FIG. 7B shows the aberration curves of the seventh embodiment of the present invention. The imaging lens system of the seventh embodiment of the present invention comprises five non-cemented lens elements, in order from an object side to an image side:

a first lens element 710 made of plastic with positive refractive power having a convex object-side surface 711 and a concave image-side surface 712, the object-side and image-side surfaces 711 and 712 thereof being aspheric;

a second lens element 720 made of plastic with negative refractive power having a convex object-side surface 721 and a concave image-side surface 722, the object-side and image-side surfaces 721 and 722 thereof being aspheric;

a third lens element 730 made of plastic with negative refractive power having a concave object-side surface 731 and a convex image-side surface 732, the object-side and image-side surfaces 731 and 732 thereof being aspheric;

a fourth lens element 740 made of plastic with negative refractive power having a convex object-side surface 741 and a concave image-side surface 742, the object-side and image-side surfaces 741 and 742 thereof being aspheric, and at least one inflection point is formed on both the object-side surface 741 and the image-side surface 742 thereof; and a fifth lens element 750 made of plastic with positive refractive power having a convex object-side surface 751 and a convex image-side surface 752, the object-side and image-side surfaces 751 and 752 thereof being aspheric;

wherein a stop, can be an aperture stop 700 is disposed between an imaged object and the first lens element 710;

the imaging lens system further comprises an IR filter 760 disposed between the image-side surface 752 of the fifth lens element 750 and an image plane 780, and the IR filter 760 is made of glass and has no influence on the focal length of the imaging lens system; the imaging lens system further comprises an image sensor 770 provided on the image plane 780.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 4.22 mm, Fno = 2.75, HFOV = 33.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.171 | | | | |
| 2 | Lens 1 | 1.470740 (ASP) | 0.529 | Plastic | 1.544 | 55.9 | 3.07 |
| 3 | | 10.787800 (ASP) | 0.086 | | | | |
| 4 | Lens 2 | 5.808500 (ASP) | 0.250 | Plastic | 1.633 | 23.4 | −8.55 |
| 5 | | 2.754970 (ASP) | 0.867 | | | | |
| 6 | Lens 3 | −0.621840 (ASP) | 0.250 | Plastic | 1.607 | 26.6 | −113.84 |
| 7 | | −0.722800 (ASP) | 0.050 | | | | |
| 8 | Lens 4 | 1.812580 (ASP) | 0.538 | Plastic | 1.607 | 26.6 | −10.58 |
| 9 | | 1.255130 (ASP) | 0.210 | | | | |
| 10 | Lens 5 | 4.833600 (ASP) | 0.961 | Plastic | 1.544 | 55.9 | 6.94 |
| 11 | | −16.051400 (ASP) | 0.500 | | | | |
| 12 | IR-filter | Plano | 0.300 | Glass | 1.517 | 64.2 | — |
| 13 | | Plano | 0.561 | | | | |
| 14 | Image | Plano | — | | | | |

\* Reference wavelength is 587.6 nm (d-line)

TABLE 19

Aspheric Coefficients

| | Surface # | | | | |
|---|---|---|---|---|---|
| | 2 | 3 | 4 | 5 | 6 |
| k = | −9.71908E−01 | −3.00000E+01 | −3.00000E+01 | −1.26973E+01 | −3.11005E+00 |
| A4 = | 1.53409E−02 | −2.06785E−01 | −1.27517E−01 | 1.16095E−01 | −5.65228E−01 |
| A6 = | −3.76255E−02 | 2.99966E−02 | 1.66972E−01 | 7.78638E−02 | 4.19365E−01 |
| A8 = | −2.26692E−02 | 1.73427E−03 | 4.86869E−02 | 1.75535E−01 | 3.82699E−02 |
| A10 = | −1.21122E−01 | −8.52723E−02 | −9.31641E−02 | −2.93899E−01 | −1.38210E−01 |
| A12 = | 1.50059E−01 | 2.79397E−02 | 7.42927E−02 | 2.18500E−01 | −2.17898E−01 |
| A14 = | −3.14268E−01 | −6.03680E−04 | 1.17166E−01 | 1.37678E−01 | 6.07905E−01 |
| A16 = | 1.32170E−01 | −3.15113E−02 | −1.12348E−01 | −9.75434E−02 | −4.80018E−01 |

| | Surface # | | | | |
|---|---|---|---|---|---|
| | 7 | 8 | 9 | 10 | 11 |
| k = | −1.81209E+00 | −2.33857E+01 | −9.34105E+00 | −1.00000E+00 | −1.00000E+00 |
| A4 = | −1.26575E−01 | −7.14339E−02 | −6.01583E−02 | −4.51513E−02 | −8.83935E−03 |
| A6 = | −4.90818E−02 | 3.42945E−02 | 2.35845E−02 | 7.97086E−03 | −3.17886E−03 |
| A8 = | 1.31680E−01 | −1.38232E−02 | −7.38674E−03 | −1.90417E−04 | 5.08075E−04 |

TABLE 19-continued

| Aspheric Coefficients | | | | | |
|---|---|---|---|---|---|
| A10 = | 8.90732E−02 | 7.78164E−04 | 9.53477E−04 | −6.36456E−05 | 2.70302E−06 |
| A12 = | −6.66118E−02 | 4.34538E−04 | 3.27806E−05 | 2.10497E−06 | −2.47236E−06 |
| A14 = | −6.80577E−02 | −2.81959E−05 | −1.41370E−05 | | |
| A16 = | 4.10189E−02 | | | | |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20; wherein the unit of HFOV is expressed in degree.

TABLE 20

| (Embodiment 7) | | | |
|---|---|---|---|
| f | 4.22 | R8/R9 | 0.26 |
| Fno | 2.75 | f/f1 | 1.38 |
| HFOV | 33.7 | f/f2 | −0.49 |
| V1 − V2 | 32.5 | |f/f3| | 0.04 |
| CT3/T23 | 0.29 | f/f5 | 0.61 |
| (CT2 + CT3)/CT5 | 0.52 | SD/TD | 0.95 |
| (R3 + R4)/(R3 − R4) | 2.80 | BFL/TTL | 0.27 |
| R7/R8 | 1.44 | TTL/ImgH | 1.75 |

Embodiment 8

Figure 8A:
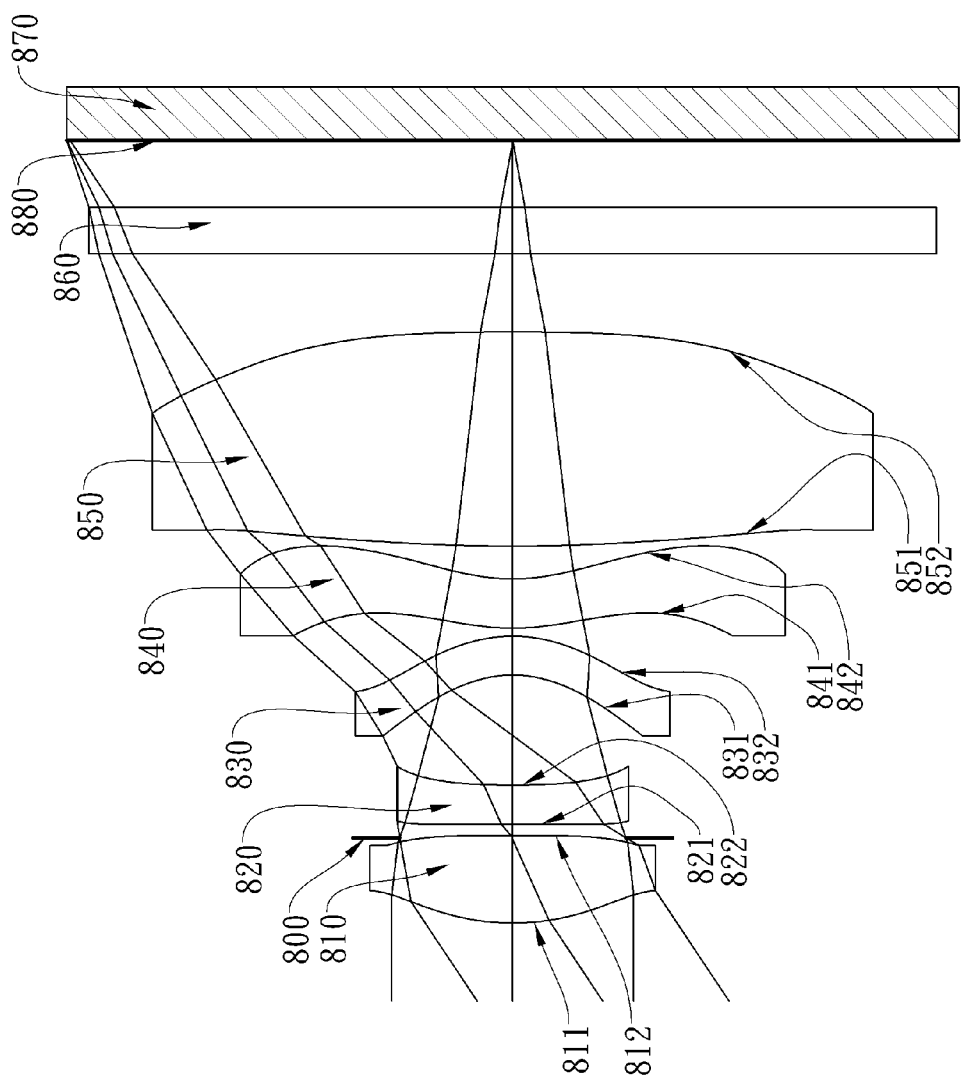
FIG. 8A shows an imaging lens system in accordance with an eighth embodiment of the present invention.
Figure 8B:
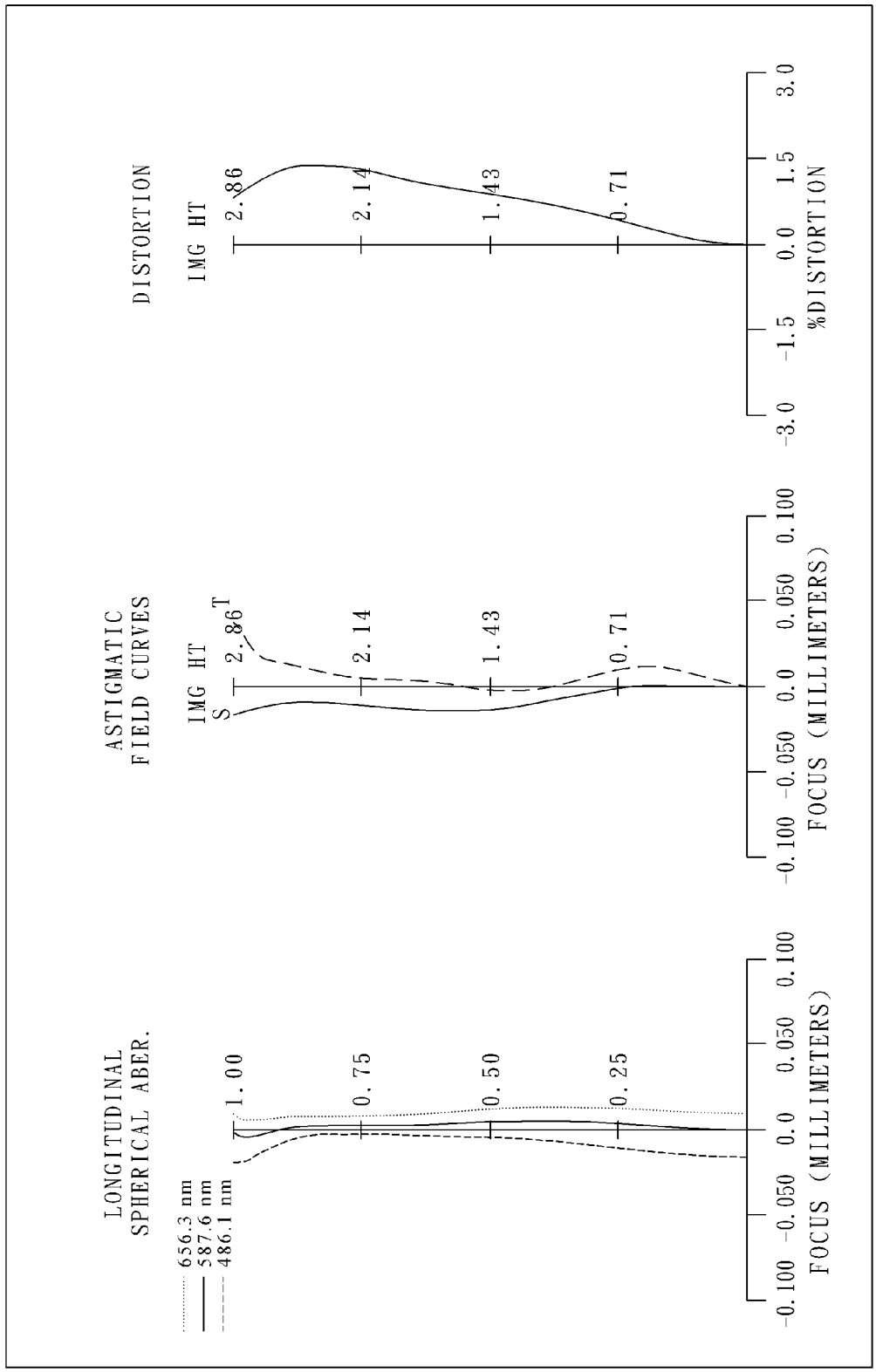
FIG. 8B shows the aberration curves of the eighth embodiment of the present invention.

FIG. 8A shows an imaging lens system in accordance with the eighth embodiment of the present invention, and FIG. 8B shows the aberration curves of the eighth embodiment of the present invention. The imaging lens system of the eighth embodiment of the present invention comprises five non-cemented lens elements, in order from an object side to an image side:

a first lens element 810 made of glass with positive refractive power having a convex object-side surface 811 and a concave image-side surface 812, the object-side and image-side surfaces 811 and 812 thereof being aspheric;

a second lens element 820 made of plastic with negative refractive power having a concave object-side surface 821 and a concave image-side surface 822, the object-side and image-side surfaces 821 and 822 thereof being aspheric;

a third lens element 830 made of plastic with negative refractive power having a concave object-side surface 831 and a convex image-side surface 832, the object-side and image-side surfaces 831 and 832 thereof being aspheric;

a fourth lens element 840 made of plastic with negative refractive power having a convex object-side surface 841 and a concave image-side surface 842, the object-side and image-side surfaces 841 and 842 thereof being aspheric, and at least one inflection point is formed on both the object-side surface 841 and the image-side surface 842 thereof; and a fifth lens element 850 made of plastic with positive refractive power having a convex object-side surface 851 and a convex image-side surface 852, the object-side and image-side surfaces 851 and 852 thereof being aspheric;

wherein a stop, can be an aperture stop 800 is disposed between the first lens element 810 and the second lens element 820;

the imaging lens system further comprises an IR filter 860 disposed between the image-side surface 852 of the fifth lens element 850 and an image plane 880, and the IR filter 860 is made of glass and has no influence on the focal length of the imaging lens system; the imaging lens system further comprises an image sensor 870 provided on the image plane 880.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

| (Embodiment 8) f = 4.26 mm, Fno = 2.75, HFOV = 33.6 deg. | | | | | | | |
|---|---|---|---|---|---|---|---|
| Surface # | | Curvature Radius | Thickness | Material | Index | Abbe # | Focal length |
| 0 | Object | Plano | Infinity | | | | |
| 1 | Lens 1 | 1.493690 (ASP) | 0.560 | Glass | 1.592 | 60.6 | 2.61 |
| 2 | | 37.551300 (ASP) | −0.012 | | | | |
| 3 | Ape. Stop | Plano | 0.086 | | | | |
| 4 | Lens 2 | −58.818400 (ASP) | 0.250 | Plastic | 1.607 | 26.6 | −7.54 |
| 5 | | 4.971800 (ASP) | 0.706 | | | | |
| 6 | Lens 3 | −0.741870 (ASP) | 0.250 | Plastic | 1.607 | 26.6 | −11.96 |
| 7 | | −0.931470 (ASP) | 0.050 | | | | |
| 8 | Lens 4 | 1.416890 (ASP) | 0.316 | Plastic | 1.544 | 55.9 | −30.17 |
| 9 | | 1.201810 (ASP) | 0.210 | | | | |
| 10 | Lens 5 | 9.946200 (ASP) | 1.374 | Plastic | 1.544 | 55.9 | 12.25 |
| 11 | | −19.203300 (ASP) | 0.500 | | | | |
| 12 | IR-filter | Plano | 0.300 | Glass | 1.517 | 64.2 | — |
| 13 | | Plano | 0.427 | | | | |
| 14 | Image | Plano | — | | | | |

* Reference wavelength is 587.6 nm (d-line)

TABLE 22

Aspheric Coefficients

| | Surface # | | | | |
|---|---|---|---|---|---|
| | 1 | 2 | 4 | 5 | 6 |
| k = | −1.10249E+00 | −2.24640E+01 | −3.00000E+01 | −2.77746E+01 | −3.88950E+00 |
| A4 = | 8.64953E−03 | −1.96124E−01 | −5.93298E−02 | 1.44070E−01 | −4.54819E−01 |
| A6 = | −4.56470E−02 | 3.07096E−02 | 2.25694E−01 | 1.34095E−01 | 4.33678E−01 |
| A8 = | −2.20451E−02 | 7.71990E−02 | 8.10290E−02 | 1.25619E−01 | 3.74901E−02 |
| A10 = | −1.48256E−01 | −6.50753E−02 | −4.46236E−02 | −3.29946E−01 | −1.42277E−01 |
| A12 = | 1.09294E−01 | −3.31857E−02 | −8.71238E−03 | 3.37086E−01 | −2.02543E−01 |
| A14 = | −1.52973E−01 | −1.28632E−01 | 7.83397E−02 | 2.66104E−01 | 5.33194E−01 |
| A16 = | 1.13810E−01 | 1.85593E−01 | −2.18273E−02 | −9.75215E−02 | −5.05168E−01 |

| | Surface # | | | | |
|---|---|---|---|---|---|
| | 7 | 8 | 9 | 10 | 11 |
| k = | −1.87495E+00 | −1.28780E+01 | −6.56852E+00 | −1.00000E+00 | −1.00000E+00 |
| A4 = | −3.80369E−02 | −1.21169E−01 | −8.30683E−02 | −1.47640E−02 | −1.98343E−02 |
| A6 = | 1.99072E−02 | 2.18559E−02 | 2.41619E−02 | 5.16576E−03 | −1.46449E−03 |
| A8 = | 1.34153E−01 | −7.09891E−03 | −7.49646E−03 | −5.12809E−04 | 8.80855E−04 |
| A10 = | 6.72133E−02 | 1.66974E−03 | 1.19788E−03 | −6.61207E−05 | −1.88074E−05 |
| A12 = | −6.89385E−02 | 2.51729E−04 | 6.21551E−05 | 6.83026E−07 | −9.90989E−06 |
| A14 = | −6.72356E−02 | −4.02165E−05 | −6.33717E−05 | | |
| A16 = | 4.11256E−02 | | | | |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23; wherein the unit of HFOV is expressed in degree.

TABLE 23

(Embodiment 8)

| f | 4.26 | R8/R9 | 0.12 |
|---|---|---|---|
| Fno | 2.75 | f/f1 | 1.63 |
| HFOV | 33.6 | f/f2 | −0.57 |
| V1 − V2 | 34.0 | |f/f3| | 0.36 |
| CT3/T23 | 0.35 | f/f5 | 0.35 |
| (CT2 + CT3)/CT5 | 0.36 | SD/TD | 0.86 |
| (R3 + R4)/(R3 − R4) | 0.84 | BFL/TTL | 0.24 |
| R7/R8 | 1.18 | TTL/ImgH | 1.72 |

Embodiment 9

Figure 9A:
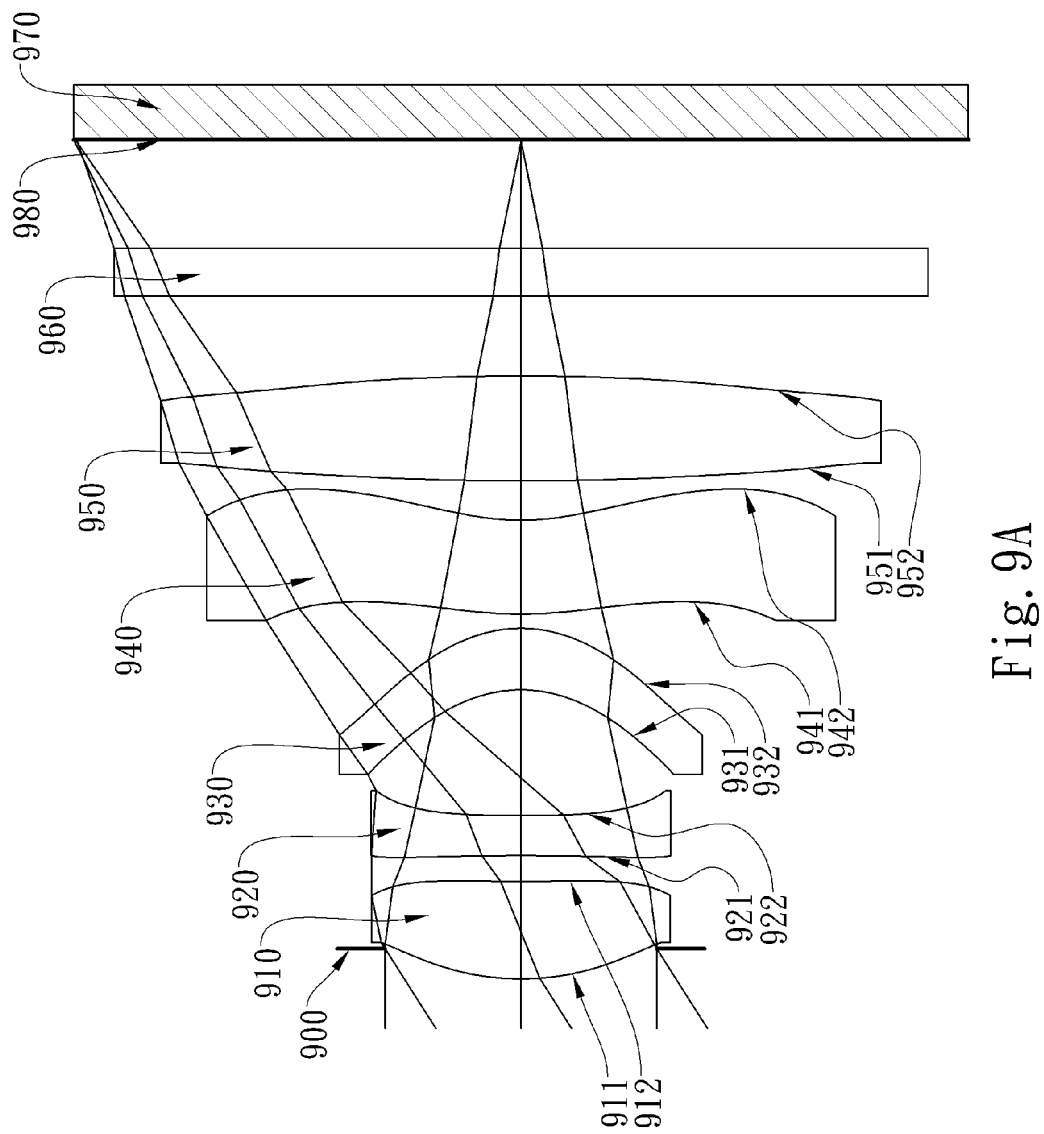
FIG. 9A shows an imaging lens system in accordance with a ninth embodiment of the present invention.
Figure 9B:
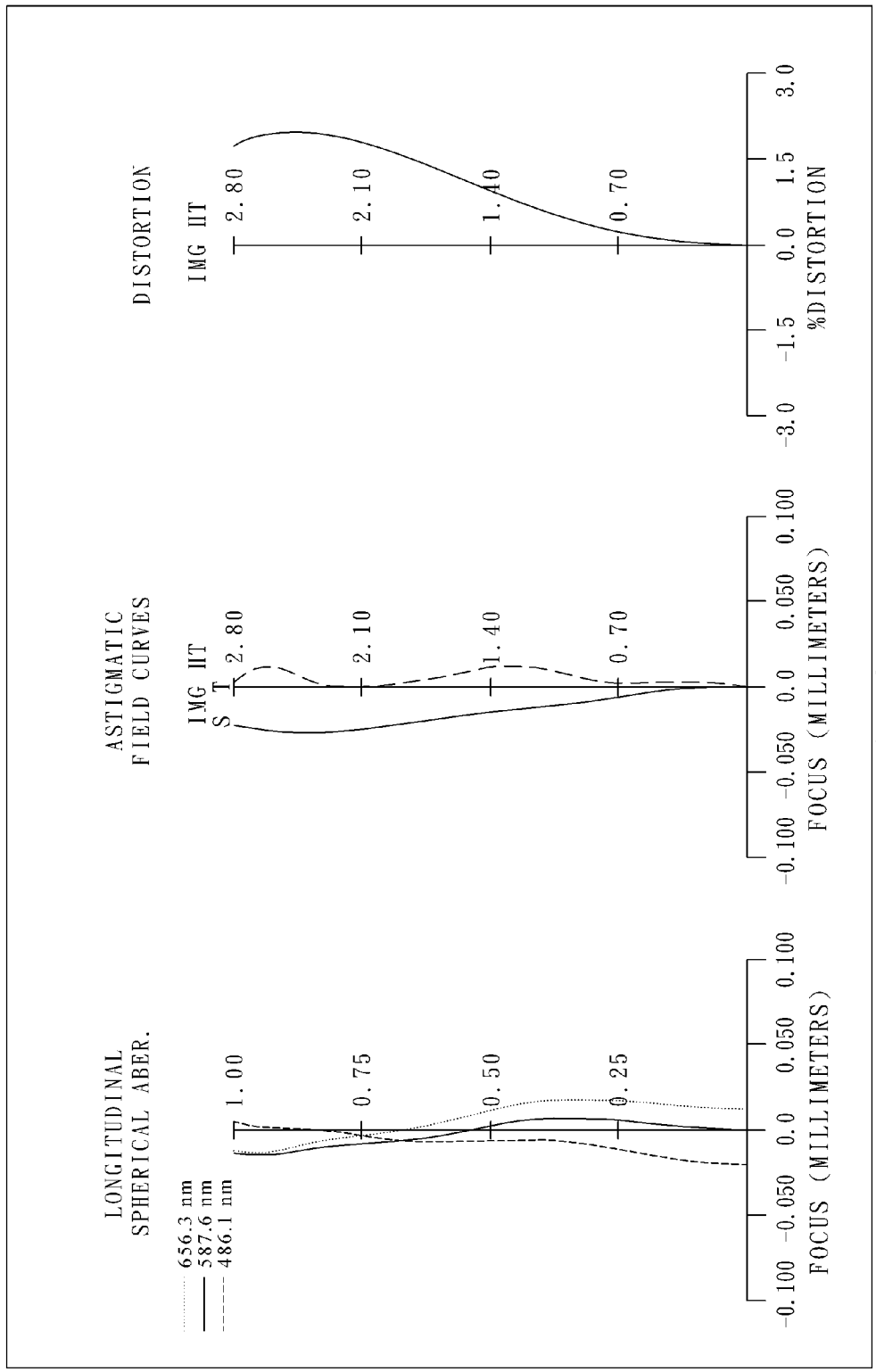
FIG. 9B shows the aberration curves of the ninth embodiment of the present invention.

FIG. 9A shows an imaging lens system in accordance with the ninth embodiment of the present invention, and FIG. 9B shows the aberration curves of the ninth embodiment of the present invention. The imaging lens system of the ninth embodiment of the present invention comprises five non-cemented lens elements, in order from an object side to an image side:

a first lens element 910 made of plastic with positive refractive power having a convex object-side surface 911 and a concave image-side surface 912, the object-side and image-side surfaces 911 and 912 thereof being aspheric;

a second lens element 920 made of plastic with negative refractive power having a concave object-side surface 921 and a concave image-side surface 922, the object-side and image-side surfaces 921 and 922 thereof being aspheric;

a third lens element 930 made of plastic with positive refractive power having a concave object-side surface 931 and a convex image-side surface 932, the object-side and image-side surfaces 931 and 932 thereof being aspheric;

a fourth lens element 940 made of plastic with negative refractive power having a convex object-side surface 941 and a concave image-side surface 942, the object-side and image-side surfaces 941 and 942 thereof being aspheric, and at least one inflection point is formed on both the object-side surface 941 and the image-side surface 942 thereof; and a fifth lens element 950 made of plastic with positive refractive power having a convex object-side surface 951 and a convex image-side surface 952, the object-side and image-side surfaces 951 and 952 thereof being aspheric;

wherein a stop, can be an aperture stop 900 is disposed between an imaged object and the first lens element 910;

the imaging lens system further comprises an IR filter 960 disposed between the image-side surface 952 of the fifth lens element 950 and an image plane 980, and the IR filter 960 is made of glass and has no influence on the focal length of the imaging lens system; the imaging lens system further comprises an image sensor 970 provided on the image plane 980.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
f = 4.34 mm, Fno = 2.55, HFOV = 32.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.189 | | | | |

TABLE 24-continued (Embodiment 9)
f = 4.34 mm, Fno = 2.55, HFOV = 32.4 deg.

| Surface # | | Curvature Radius | | Thickness | Material | Index | Abbe # | Focal length |
|---|---|---|---|---|---|---|---|---|
| 2 | Lens 1 | 1.581830 | (ASP) | 0.611 | Plastic | 1.544 | 55.9 | 3.24 |
| 3 | | 13.444700 | (ASP) | 0.161 | | | | |
| 4 | Lens 2 | −22.892800 | (ASP) | 0.250 | Plastic | 1.650 | 21.4 | −9.48 |
| 5 | | 8.457300 | (ASP) | 0.790 | | | | |
| 6 | Lens 3 | −0.826460 | (ASP) | 0.385 | Plastic | 1.544 | 55.9 | 11.04 |
| 7 | | −0.845740 | (ASP) | 0.089 | | | | |
| 8 | Lens 4 | 2.360390 | (ASP) | 0.588 | Plastic | 1.650 | 21.4 | −8.12 |
| 9 | | 1.471030 | (ASP) | 0.246 | | | | |
| 10 | Lens 5 | 16.331000 | (ASP) | 0.658 | Plastic | 1.544 | 55.9 | 15.86 |
| 11 | | −18.046600 | (ASP) | 0.500 | | | | |
| 12 | IR-filter | Plano | | 0.300 | Glass | 1.517 | 64.2 | — |
| 13 | | Plano | | 0.680 | | | | |
| 14 | Image | Plano | | — | | | | |

* Reference wavelength is 587.6 nm (d-line)

TABLE 25

Aspheric Coefficients

| | Surface # | | | | |
|---|---|---|---|---|---|
| | 2 | 3 | 4 | 5 | 6 |
| k = | −8.80749E−01 | −1.00000E+00 | −1.00000E+00 | −1.67828E+02 | −3.47566E+00 |
| A4 = | 1.16319E−02 | −1.02491E−01 | −3.44443E−02 | 1.08956E−01 | −4.01874E−01 |
| A6 = | −1.11639E−02 | −4.72969E−02 | 8.74096E−02 | 4.95734E−02 | 1.83391E−01 |
| A8 = | 6.93713E−03 | −1.57819E−03 | −4.02577E−02 | 1.17689E−01 | 1.69089E−01 |
| A10 = | −1.62292E−01 | −3.18702E−02 | −9.79670E−02 | −1.16951E−01 | 1.21017E−02 |
| A12 = | 2.47648E−01 | −1.84716E−03 | 2.15725E−01 | −1.13455E−01 | −5.25765E−01 |
| A14 = | −2.03144E−01 | 6.34753E−02 | −9.68095E−02 | 2.84027E−01 | 6.69946E−01 |
| A16 = | 2.69680E−02 | −5.25668E−02 | 6.11509E−03 | −1.20463E−01 | −3.10704E−01 |

| | Surface # | | | | |
|---|---|---|---|---|---|
| | 7 | 8 | 9 | 10 | 11 |
| k = | −1.24664E+00 | −2.28709E+01 | −9.19283E+00 | −5.39855E+00 | −6.71598E+01 |
| A4 = | −3.32395E−02 | −7.66563E−02 | −5.95099E−02 | −3.94108E−03 | −1.05674E−02 |
| A6 = | −3.98701E−02 | 3.28273E−02 | 1.98922E−02 | 7.62435E−05 | 3.04736E−03 |
| A8 = | 4.37933E−02 | −1.13886E−02 | −6.16864E−03 | 2.88370E−04 | −9.55262E−05 |
| A10 = | 7.11457E−02 | 1.01319E−03 | 8.28222E−04 | −1.01778E−05 | −2.65072E−05 |
| A12 = | −2.38263E−02 | 1.91759E−04 | −9.75291E−07 | −6.18699E−06 | −7.49131E−07 |
| A14 = | −3.89798E−02 | −2.29607E−05 | −7.51970E−06 | | |
| A16 = | 1.70098E−02 | | | | |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26; wherein the unit of HFOV is expressed in degree.

TABLE 26

(Embodiment 9)

| f | 4.34 | R8/R9 | 0.09 |
|---|---|---|---|
| Fno | 2.55 | f/f1 | 1.34 |
| HFOV | 32.4 | f/f2 | −0.46 |
| V1 − V2 | 34.5 | |f/f3| | 0.39 |
| CT3/T23 | 0.49 | f/f5 | 0.27 |
| (CT2 + CT3)/CT5 | 0.97 | SD/TD | 0.95 |
| (R3 + R4)/(R3 − R4) | 0.46 | BFL/TTL | 0.28 |
| R7/R8 | 1.60 | TTL/ImgH | 1.84 |

Embodiment 10

Figure 10A:
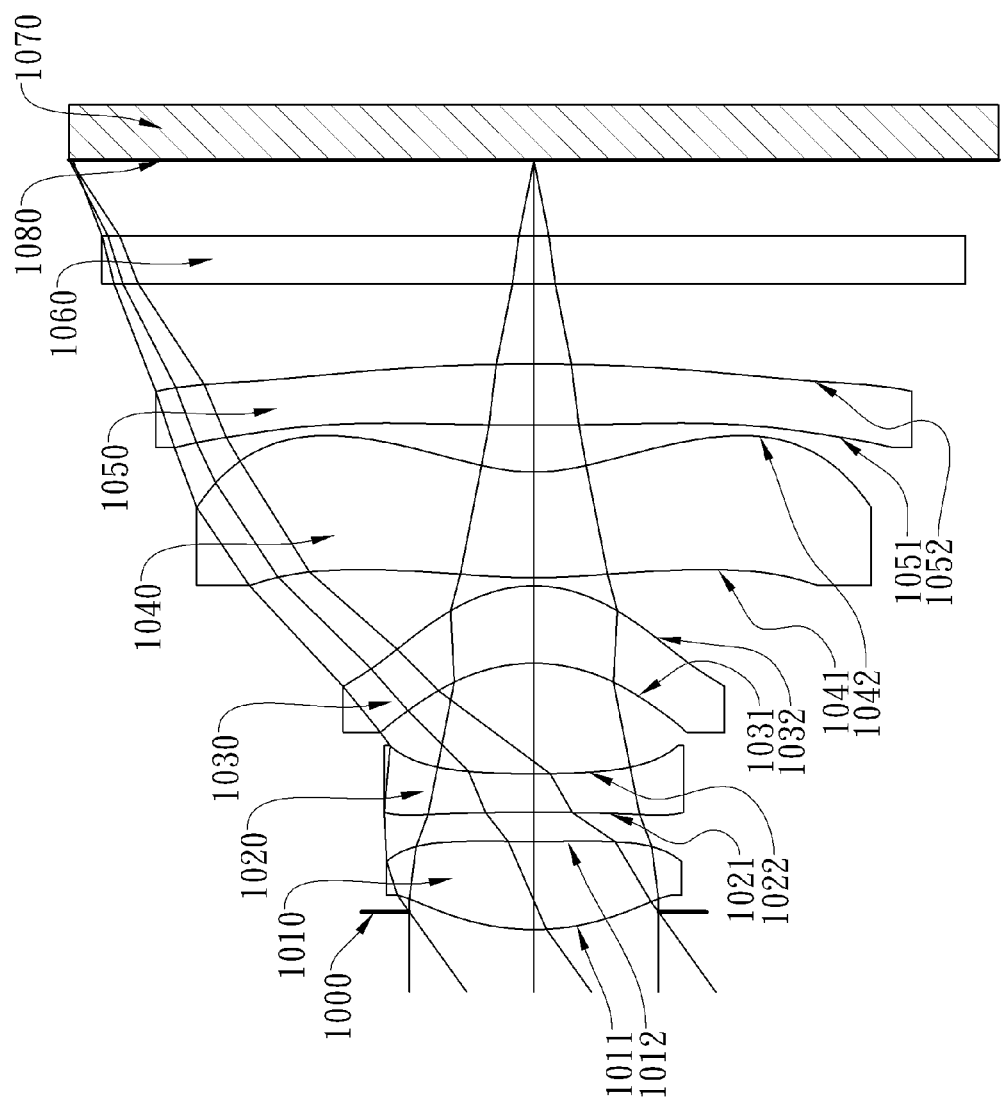
FIG. 10A shows an imaging lens system in accordance with a tenth embodiment of the present invention.
Figure 10B:
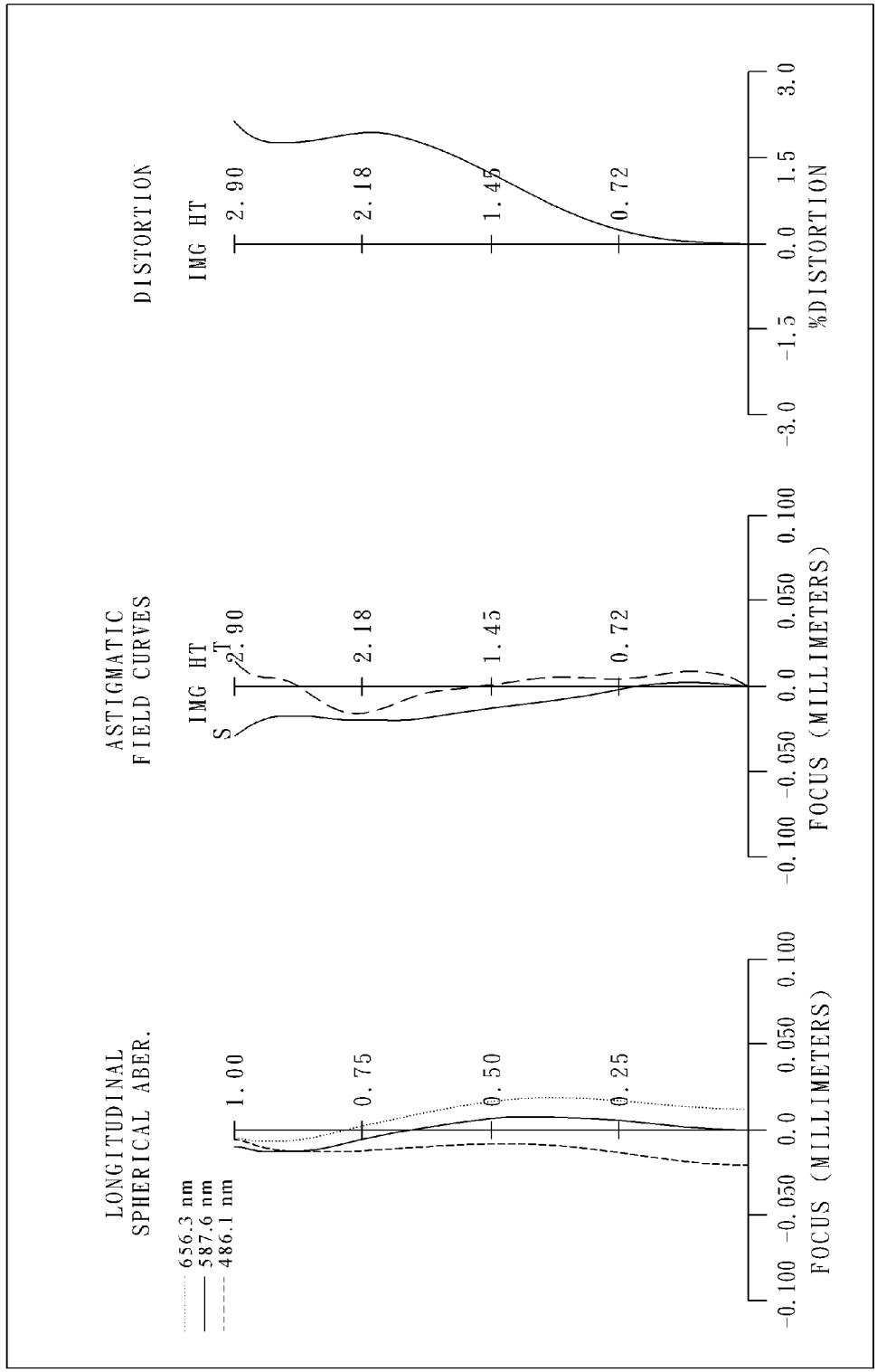
FIG. 10B shows the aberration curves of the tenth embodiment of the present invention.

FIG. 10A shows an imaging lens system in accordance with the tenth embodiment of the present invention, and FIG. 10B shows the aberration curves of the tenth embodiment of the present invention. The imaging lens system of the tenth embodiment of the present invention comprises five non-cemented lens elements, in order from an object side to an image side:

a first lens element 1010 made of plastic with positive refractive power having a convex object-side surface 1011 and a concave image-side surface 1012, the object-side and image-side surfaces 1011 and 1012 thereof being aspheric;

a second lens element 1020 made of plastic with negative refractive power having a concave object-side surface 1021 and a concave image-side surface 1022, the object-side and image-side surfaces 1021 and 1022 thereof being aspheric;

a third lens element 1030 made of plastic with positive refractive power having a concave object-side surface 1031 and a convex image-side surface 1032, the object-side and image-side surfaces 1031 and 1032 thereof being aspheric;

a fourth lens element 1040 made of plastic with negative refractive power having a convex object-side surface 1041 and a concave image-side surface 1042, the object-side and image-side surfaces 1041 and 1042 thereof being aspheric, and at least one inflection point is formed on both the object-side surface 1041 and the image-side surface 1042 thereof; and The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

TABLE 27

(Embodiment 10)
f = 3.96 mm, Fno = 2.55, HFOV = 35.6 deg.

| Surface # |  | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.110 | | | | |
| 2 | Lens 1 | 1.504010 (ASP) | 0.549 | Plastic | 1.544 | 55.9 | 2.97 |
| 3 | | 18.500800 (ASP) | 0.183 | | | | |
| 4 | Lens 2 | −24.050000 (ASP) | 0.240 | Plastic | 1.650 | 21.4 | −7.57 |
| 5 | | 6.204100 (ASP) | 0.691 | | | | |
| 6 | Lens 3 | −1.069540 (ASP) | 0.484 | Plastic | 1.544 | 55.9 | 4.11 |
| 7 | | −0.838840 (ASP) | 0.050 | | | | |
| 8 | Lens 4 | 3.348000 (ASP) | 0.660 | Plastic | 1.544 | 55.9 | −3.52 |
| 9 | | 1.133430 (ASP) | 0.292 | | | | |
| 10 | Lens 5 | 16.331000 (ASP) | 0.383 | Plastic | 1.544 | 55.9 | 13.83 |
| 11 | | −13.848100 (ASP) | 0.500 | | | | |
| 12 | IR-filter | Plano | 0.300 | Glass | 1.517 | 64.2 | — |
| 13 | | Plano | 0.475 | | | | |
| 14 | Image | Plano | — | | | | |

* Reference wavelength is 587.6 nm (d-line)

TABLE 28

Aspheric Coefficients

| | Surface # | | | | |
|---|---|---|---|---|---|
| | 2 | 3 | 4 | 5 | 6 |
| k = | −8.54867E−01 | −1.00000E+00 | −1.00000E+00 | −9.60819E+01 | −4.64904E+00 |
| A4 = | 1.31296E−02 | −1.06756E−01 | −5.15852E−02 | 1.12195E−01 | −3.62072E−01 |
| A6 = | −2.54746E−02 | −6.89907E−02 | 7.63449E−02 | 4.70086E−02 | 1.73203E−01 |
| A8 = | −3.11715E−02 | −2.01285E−02 | −3.18783E−02 | 1.22115E−01 | 1.65155E−01 |
| A10 = | −1.73848E−01 | −3.75180E−02 | −8.79952E−02 | −1.02047E−01 | 2.33623E−02 |
| A12 = | 2.40769E−01 | −2.05195E−03 | 2.35811E−01 | −9.79744E−02 | −5.14093E−01 |
| A14 = | −2.21709E−01 | 5.40724E−02 | −7.90539E−02 | 2.90414E−01 | 6.62399E−01 |
| A16 = | −4.71635E−02 | −7.00843E−02 | −9.46752E−03 | −1.25860E−01 | −3.28604E−01 |

| | Surface # | | | | |
|---|---|---|---|---|---|
| | 7 | 8 | 9 | 10 | 11 |
| k = | −1.50696E+00 | −7.35004E+01 | −7.61578E+00 | −5.64792E+01 | −7.00000E+01 |
| A4 = | −2.54688E−02 | −5.36306E−02 | −6.85795E−02 | −1.61651E−02 | −1.06425E−02 |
| A6 = | −4.33060E−02 | 3.41901E−02 | 2.18428E−02 | −9.60448E−04 | 4.08350E−03 |
| A8 = | 4.79982E−02 | −1.19622E−02 | −6.70308E−03 | 6.10677E−04 | −2.99713E−04 |
| A10 = | 7.56747E−02 | 9.70526E−04 | 7.84253E−04 | 1.35131E−05 | −3.59557E−05 |
| A12 = | −2.24009E−02 | 2.04974E−04 | −1.77762E−06 | −1.04791E−05 | 2.71672E−06 |
| A14 = | −3.95209E−02 | −2.46073E−05 | −5.44589E−06 | | |
| A16 = | 1.55128E−02 | | | | | a fifth lens element 1050 made of plastic with positive refractive power having a convex object-side surface 1051 and a convex image-side surface 1052, the object-side and image-side surfaces 1051 and 1052 thereof being aspheric;

wherein a stop, can be an aperture stop 1000 is disposed between an imaged object and the first lens element 1010;

the imaging lens system further comprises an IR filter 1060 disposed between the image-side surface 1052 of the fifth lens element 1050 and an image plane 1080, and the IR filter 1060 is made of glass and has no influence on the focal length of the imaging lens system; the imaging lens system further comprises an image sensor 1070 provided on the image plane 1080.

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29; wherein the unit of HFOV is expressed in degree.

TABLE 29

(Embodiment 10)

| f | 3.96 | R8/R9 | 0.07 |
|---|---|---|---|
| Fno | 2.55 | f/f1 | 1.33 |

TABLE 29-continued (Embodiment 10)

| | | | |
|---|---|---|---|
| HFOV | 35.6 | f/f2 | −0.52 |
| V1 − V2 | 34.5 | \|f/f3\| | 0.97 |
| CT3/T23 | 0.70 | f/f5 | 0.29 |
| (CT2 + CT3)/CT5 | 1.89 | SD/TD | 0.97 |
| (R3 + R4)/(R3 − R4) | 0.59 | BFL/TTL | 0.27 |
| R7/R8 | 2.95 | TTL/ImgH | 1.62 |

It is to be noted that TABLES 1-29 show different data of the different embodiments, however, the data of the different embodiments are obtained from experiments. Therefore, any imaging lens system of the same structure is considered to be within the scope of the present invention even if it uses different data. The embodiments depicted above and the appended drawings are exemplary and are not intended to limit the scope of the present invention.

What is claimed is:

1. An imaging lens system, in order from an object side to an image side comprising five lens elements with refractive power:

a first lens element with positive refractive power having a convex object-side surface;

a second lens element with negative refractive power;

a plastic third lens element having at least one of the object-side and image-side surfaces thereof being aspheric;

a plastic fourth lens element having a concave image-side surface, at least one of the object-side and image-side surfaces thereof being aspheric; and a plastic fifth lens element with positive refractive power having a convex object-side surface and a convex image-side surface, and at least one of the object-side and image-side surfaces thereof being aspheric;

wherein a focal length of the imaging lens system is f, a focal length of the third lens element is f3, an axial distance between the object-side surface of the first lens element and an image plane is TTL, a maximal image height of the imaging lens system is ImgH, a back focal length of the imaging lens system is BFL, and they satisfy the following relations:

$|f/f3|<1.1;$ $TTL/ImgH<2.0;$ and $0<BFL/TTL<0.40.$

2. The imaging lens system according to claim 1, wherein the first lens element, the second lens element, the third lens element, the fourth lens element and the fifth lens element are all non-cemented lens elements.

3. The imaging lens system according to claim 2, the focal length of the imaging lens system is f, the focal length of the first lens element is f1, and they satisfy the following relation:

$1.0<f/f1<1.9.$

4. The imaging lens system according to claim 3, further comprising a stop, an axial distance between the stop and the image-side surface of the fifth lens element is SD, an axial distance between the object-side surface of the first lens element and the image-side surface of the fifth lens element is TD, and they satisfy the following relation:

$0.7<SD/TD<1.1.$

5. The imaging lens system according to claim 3, wherein a curvature radius of the object-side surface of the fourth lens element is R7, a curvature radius of the image-side surface of the fourth lens element is R8, and they satisfy the following relation:

$0.4<R7/R8<3.0.$

6. The imaging lens system according to claim 3, wherein a curvature radius of the object-side surface of the second lens element is R3, a curvature radius of the image-side surface of the second lens element is R4, and they satisfy the following relation:

$0<(R3+R4)/(R3-R4)<3.5.$

7. The imaging lens system according to claim 3, wherein an Abbe number of the first lens element is V1, an Abbe number of the second lens element is V2, and they satisfy the following relation:

$27<V1-V2<45.$

8. The imaging lens system according to claim 2, wherein at least one inflection point is positioned on at least one of the object-side and image-side surfaces of the fourth lens element.

9. The imaging lens system according to claim 1, wherein a curvature radius of the image-side surface of the fourth lens element is R8, a curvature radius of the object-side surface of the fifth lens element is R9, and they satisfy the following relation:

$0<R8/R9<0.6.$

10. The imaging lens system according to claim 9, wherein the focal length of the imaging lens system is f, a focal length of the fifth lens element is f5, and they satisfy the following relation:

$0<f/f5<0.9.$

11. The imaging lens system according to claim 1, wherein the third lens element has a concave object-side surface and a convex image-side surface.

12. An imaging lens system, in order from an object side to an image side comprising five non-cemented lens elements with refractive power:

a first lens element with positive refractive power having a convex object-side surface;

a second lens element with negative refractive power;

a plastic third lens element having at least one of the object-side and image-side surfaces thereof being aspheric;

a plastic fourth lens element having a concave image-side surface, at least one of the object-side and image-side surfaces thereof being aspheric; and a plastic fifth lens element with positive refractive power having a convex object-side surface and a convex image-side surface, and at least one of the object-side and image-side surfaces thereof being aspheric;

wherein a focal length of the imaging lens system is f, a focal length of the fifth lens element is f5, a central thickness of the third lens element is CT3, an axial distance between the second lens element and the third lens element is T23, the imaging lens system further comprises a stop, an axial distance between the stop and the image-side surface of the fifth lens element is SD, an axial distance between the object-side surface of the first lens element and the image-side surface of the fifth lens element is TD, and they satisfy the following relations:

$0<f/f5<1.2;$ $0.1<CT3/T23<0.8;$ and $0.7<SD/TD<1.1.$

13. The imaging lens system according to claim 12, wherein a back focal length of the imaging lens system is BFL, an axial distance between the object-side surface of the first lens element and an image plane is TTL, and they satisfy the following relation:

$0<BFL/TTL<0.40.$

14. The imaging lens system according to claim 12, wherein the fourth lens element has a convex object-side surface and at least one inflection point is positioned on at least one of the object-side and image-side surfaces thereof.

15. The imaging lens system according to claim 12, wherein a curvature radius of the image-side surface of the fourth lens element is R8, a curvature radius of the object-side surface of the fifth lens element is R9, and they satisfy the following relation:

$0<R8/R9<0.6.$

16. The imaging lens system according to claim 12, wherein a curvature radius of the object-side surface of the second lens element is R3, a curvature radius of the image-side surface of the second lens element is R4, and they satisfy the following relation:

$0<(R3+R4)/(R3-R4)<3.5.$

17. The imaging lens system according to claim 12, wherein a central thickness of the second lens element is CT2, the central thickness of the third lens element is CT3, a central thickness of the fifth lens element is CT5, and they satisfy the following relation:

$0<(CT2+CT3)/CT5<2.0.$

18. The imaging lens system according to claim 12, wherein the third lens element has a concave object-side surface and a convex image-side surface.

19. An imaging lens system, in order from an object side to an image side comprising five lens elements with refractive power:
- a first lens element with positive refractive power having a convex object-side surface;
- a second lens element with negative refractive power;
- a plastic third lens element having at least one of the object-side and image-side surfaces thereof being aspheric;
- a plastic fourth lens element having a concave image-side surface, at least one of the object-side and image-side surfaces thereof being aspheric, at least one inflection point is positioned on at least one of the object-side and image-side surfaces thereof; and
- a plastic fifth lens element with positive refractive power having a convex object-side surface and a convex image-side surface, and at least one of the object-side and image-side surfaces thereof being aspheric;
- wherein a focal length of the imaging lens system is f, a focal length of the second lens element is f2, a focal length of the third lens element is f3, and they satisfy the following relations:

$-1.4<f/f2<0;$ and $|f/f3|<1.1.$

20. The imaging lens system according to claim 19, wherein a back focal length of the imaging lens system is BFL, an axial distance between the object-side surface of the first lens element and an image plane is TTL, and they satisfy the following relation:

$0<BFL/TTL<0.40.$

21. The imaging lens system according to claim 19, further comprising a stop, an axial distance between the stop and the image-side surface of the fifth lens element is SD, an axial distance between the object-side surface of the first lens element and the image-side surface of the fifth lens element is TD, and they satisfy the following relation:

$0.7<SD/TD<1.1.$

22. The imaging lens system according to claim 19, wherein a curvature radius of the image-side surface of the fourth lens element is R8, a curvature radius of the object-side surface of the fifth lens element is R9, and they satisfy the following relation:

$0<R8/R9<0.6.$

23. An imaging lens system, in order from an object side to an image side comprising five lens elements with refractive power:
- a first lens element with positive refractive power having a convex object-side surface;
- a second lens element with negative refractive power;
- a plastic third lens element having a convex image-side surface, at least one of the object-side and image-side surfaces thereof being aspheric;
- a plastic fourth lens element having a convex object-side surface and a concave image-side surface, at least one of the object-side and image-side surfaces thereof being aspheric, and at least one inflection point is positioned on at least one of the object-side and image-side surfaces thereof; and
- a plastic fifth lens element with positive refractive power having a convex object-side surface and a convex image-side surface, and at least one of the object-side and image-side surfaces thereof being aspheric;
- wherein an axial distance between the object-side surface of the first lens element and an image plane is TTL, a maximal image height of the imaging lens system is ImgH, a central thickness of the second lens element is CT2, a central thickness of the third lens element is CT3, a central thickness of the fifth lens element is CT5, and they satisfy the following relations:

$TTL/ImgH<2.0;$ and $0<(CT2+CT3)/CT5<2.0.$

24. The imaging lens system according to claim 23, wherein a focal length of the imaging lens system is f, a focal length of the third lens element is f3, and they satisfy the following relation:

$|f/f3|<1.1.$

25. The imaging lens system according to claim 23, wherein a focal length of the imaging lens system is f, a focal length of the fifth lens element is f5, and they satisfy the following relation:

$0<f/f5<0.9.$

* * * * *